(12) United States Patent
Yanagi et al.

(10) Patent No.: US 8,664,296 B2
(45) Date of Patent: Mar. 4, 2014

(54) INK SET FOR INK JET RECORDING AND INK JET RECORDING METHOD

(75) Inventors: Terukazu Yanagi, Kanagawa (JP); Takahiro Ishizuka, Kanagawa (JP); Akio Tamura, Kanagawa (JP); Takahiro Kato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 924 days.

(21) Appl. No.: 12/492,145

(22) Filed: Jun. 26, 2009

(65) Prior Publication Data

US 2010/0003408 A1  Jan. 7, 2010

(30) Foreign Application Priority Data

Jul. 4, 2008 (JP) ................................. 2008-175965

(51) Int. Cl.
*C09D 133/02* (2006.01)

(52) U.S. Cl.
USPC ............ 523/160; 523/161; 427/256; 524/599

(58) Field of Classification Search
USPC ................................. 523/160, 161
See application file for complete search history.

(56) References Cited

U.S. PATENT DOCUMENTS

| 4,119,478 A | 10/1978 | Robertson |
| 6,057,384 A * | 5/2000 | Nguyen et al. ................ 523/160 |
| 2004/0063808 A1 | 4/2004 | Ma et al. |
| 2004/0173120 A1 | 9/2004 | Tsuru et al. |
| 2006/0057339 A1 * | 3/2006 | Adachi et al. .............. 428/195.1 |
| 2006/0158495 A1 | 7/2006 | Okubo |
| 2006/0241209 A1 | 10/2006 | Madle et al. |
| 2007/0054981 A1 * | 3/2007 | Yanagi et al. ................ 523/160 |
| 2007/0209550 A1 | 9/2007 | Tsuru et al. |
| 2008/0055385 A1 * | 3/2008 | Houjou ........................ 347/213 |
| 2008/0192098 A1 | 8/2008 | Tsuru et al. |
| 2009/0162569 A1 | 6/2009 | Morohoshi et al. |
| 2010/0053288 A1 | 3/2010 | Ohzeki et al. |

FOREIGN PATENT DOCUMENTS

| EP | 1 245 644 | * 10/2002 |
| JP | 9207424 | 8/1997 |
| JP | 3069543 | 7/2000 |
| JP | 2002-52804 A | 2/2002 |
| JP | 3534395 | 6/2004 |
| JP | 2006-321992 | 11/2006 |
| JP | 2007-131684 | 5/2007 |

(Continued)

OTHER PUBLICATIONS

English language translation of the following: Office Action dated May 28, 2013 from the JPO in a Japanese patent application corresponding to the instant patent application. This office action translation is submitted now in order to supplement the understanding of patent document JP2008-105422, JP2006-321992, JP2007-131684, JP2007-154133, JP2008-101192 and WO2005-002867 which are cited in the office action and are being disclosed in the instant information Disclosure Statement.

*Primary Examiner* — Doris Lee
(74) *Attorney, Agent, or Firm* — SOLARIS Intellectual Property Group, PLLC

(57) ABSTRACT

An ink set for ink jet recording including an ink composition containing a coloring material, and a polymer particle including 65 mass % or more of a constituent unit derived from a methacrylic acid derivative, and a treating liquid which forms an aggregate when contacted with the ink composition, and an ink jet recording method using the same are provided.

17 Claims, 1 Drawing Sheet

(56) References Cited

FOREIGN PATENT DOCUMENTS

| | | |
|---|---|---|
| JP | 2007-154133 | 6/2007 |
| JP | 2008-101192 | 5/2008 |
| JP | 2008-105422 | 5/2008 |
| WO | 2005-002867 | 1/2005 |
| WO | WO 2006/095794 * | 9/2006 |

* cited by examiner

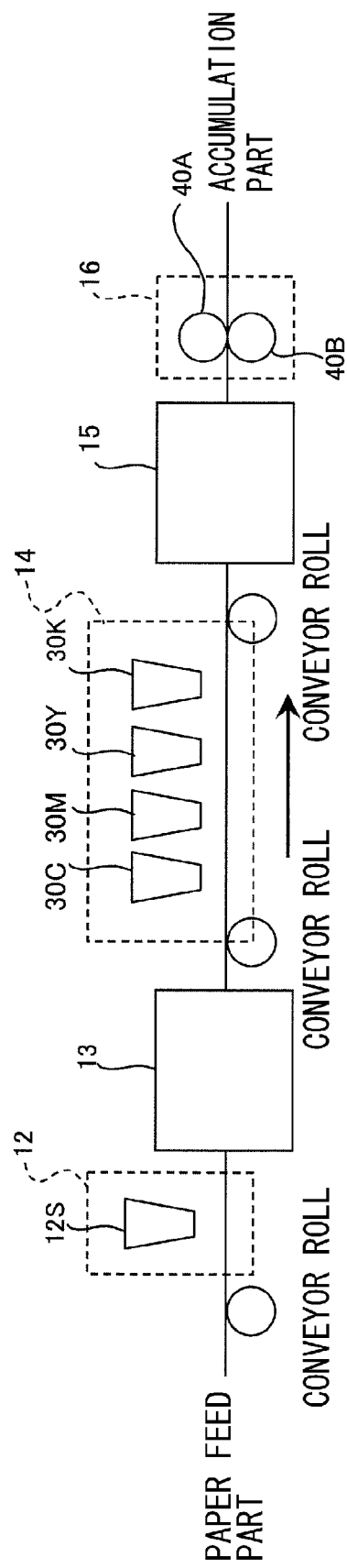

INK SET FOR INK JET RECORDING AND INK JET RECORDING METHOD

CROSS-REFERENCE TO RELATED APPLICATION

This application claims priority under 35 USC 119 from Japanese Patent Application No. 2008-175965 filed on Jul. 4, 2008, the disclosure of which is incorporated by reference herein.

BACKGROUND OF THE INVENTION

1. Field of the Invention

The present invention relates to an ink set for ink jet recording, and an ink jet recording method using the same.

2. Description of the Related Art

As recording media for ink-jet recording, various recording media have been studied and techniques capable of forming high quality images are in demand. Further, for inks, various ink materials have been investigated from the viewpoints of water proofness and light fastness, etc.

For example, for a colorant, which is one ingredient contained in ink materials, pigments have generally been used and the pigments are used as dispersed in a dispersion medium such as water. When using a pigment in a dispersion form, the diameter of particles when they are dispersed, stability after dispersion, particle size uniformity, and ejection properties from an ejection head and the like are important considerations, and various studies have been conducted regarding techniques for improving these aspects.

On the other hand, when recording is performed on plain paper or the like, sufficient performance sometimes cannot be obtained with respect to, for example, fixing property (for example, scratch resistance) or resolution, in addition to color forming density. In particular, this is the case when increasing the speed of ink-jet recording, and a recording method more suitable for high speed recording using a single pass system capable of recording by one operation of a head, as opposed to a shuttle scanning system, is in demand.

As the technique regarding the above description, a recording method of adhering a reaction solution containing a reactant which forms an aggregate when it is contacted with an ink composition, and an ink composition having a surface tension which is the same as or lower than the surface tension of a recording medium, on the recording medium, is disclosed (see e.g. Japanese Patent Application Laid-Open (JP-A) No. 2002-52804).

However, in the ink composition described in JP-A 2002-52804, when high speed recording in which the time from application of a first color ink to application of a second color ink is one second or shorter is conducted, so-called secondary color image deformation, in which an image of a secondary color and thereafter is shrunk, is generated.

SUMMARY OF THE INVENTION

The present invention has been made in view of the above circumstances and provides an ink set for ink jet recording and an ink jet recording method.

A first aspect of the present invention provides an ink set for ink jet recording, including an ink composition containing a polymer particle having 65 mass % or more of a constituent unit derived from a methacrylic acid derivative and a coloring material, and a treating liquid which form an aggregate when contacted with the ink composition.

A second aspect of the present invention provides an ink jet recording method including: applying an ink composition containing a coloring material and a polymer particle having 65 mass % or more of a constituent unit derived from methacrylic acid derivative, on a recording medium, by an ink jet system; and applying a treating liquid which form an aggregate when contacted with the ink composition, on the recording medium.

BRIEF DESCRIPTION OF THE DRAWINGS

FIG. 1 is a schematic view showing a construction example of an ink jet recording apparatus which is used for implementing the image recording method of the invention.

DETAILED DESCRIPTION OF THE INVENTION

The ink set for ink jet recording of the present invention, and the ink jet recording method using the same will be described in detail below.

<Ink Set for Ink Jet Recording>

The ink set for ink jet recording of the invention comprises an ink composition containing a polymer particle having 65 mass % or more of a constituent unit derived from a methacrylic acid derivative and a coloring material, and a treating liquid which form an aggregate when it is contacted with the ink composition, whereby the ink composition is aggregated at contact with the treating liquid to form an image.

The ink set for ink jet recording of the invention may be in the form in which each one ink composition and one treating liquid are contained, or in the form in which plural ink compositions and plural treating liquids are contained. In the invention, it is preferable that the ink set of the invention is in the form in which at least plural ink compositions are contained.

Conventionally, when a multi-color image is recorded using two or more ink compositions by an ink jet system, in the case of an ink composition in which polymer particles of a latex or the like are present in admixture with a coloring material such as a pigment, an image covered with a film of the polymer particles is finally obtained. However, for example, when after first color image recording, a second or third color or thereafter image is recorded so as to contact or overlap with this, for example, a coloring material moves on the first color image, density unevenness or color unevenness is seen in a final image, and this deteriorates higher image quality in some cases. This phenomenon is called secondary color image deformation, and becomes problematic in high speed recording having the time interval between first color ink droplet ejection and second color ink droplet ejection of 1 second or shorter, in some cases. This secondary color image deformation is known to be remarkably generated when both of a first color ink and a second color ink form a solid image.

In the invention, since the polymer particle contained in the ink composition constituting the ink set for ink jet recording has 65 mass % or more of a constituent unit derived from a methacrylic acid derivative, generation of secondary color image deformation may be effectively suppressed even when a multi-color solid image is recorded at a high speed.

—Ink Composition—

The ink composition contains polymer particle of at least one type having 65 mass % or more of a constituent unit derived from a methacrylic acid derivative, and at least one coloring material and, if necessary, may contain a hydrophilic organic solvent, a surfactant, water, and other additive. Each component constituting the ink composition will be described in detail below.

(Polymer Particle)

The ink composition in the invention contains polymer particle of at least one type. A polymer particle (molecule) constituting the polymer particle in the invention is constructed with a constituent unit derived from a methacrylic acid derivative monomer, and a constituent unit derived from other monomers, and it is characterized in that 65 mass % or more of a constituent unit of the polymer is derived from a methacrylic acid derivative. In the invention, from the viewpoint of suppression of secondary color image deformation, it is preferable that 80 mass % or more of a constituent unit of the polymer is derived from a methacrylic acid derivative.

As used herein, the methacrylic acid derivative means methacrylic acid esters, methacrylic acid amides, and methacrylic acid.

The methacrylic acid esters are not particularly limited as far as they are an ester of methacrylic acid, and may be an alkyl ester, or an aryl ester. Specific examples thereof include alkyl methacrylates such as methyl methacrylate, ethyl methacrylate, isopropyl methacrylate, n-propyl methacrylate, n-butyl methacrylate, isobutyl methacrylate, t-butyl methcarylate, hexyl methacrylate, and ethylhexyl methacrylate; alkyl methacrylates having an aromatic ring, such as benzyl methacrylate, and phenoxyethyl methacrylate; alkyl methacrylates having a hydroxy group, such as hydroxymethyl methacrylate, 2-hydroxyethyl methacrylate, 2-hydroxypropyl methacrylate, 4-hydroxybutyl methacrylate, hydroxypentyl methacrylate, and hydroxyhexyl methacrylate; dialkylaminoalkyl methacrylates such as dimethylaminoethyl methacrylate; aryl methacrylates such as phenyl methacrylate.

The methacrylic acid amides are not particularly limited as far as they are an amide of methacrylic acid, and may be alkyl amide or aryl amide. Specific examples thereof include N-hydroxyalkyl methacrylamides such as N-hydroxymethyl methacrylamide, N-hydroxyethyl methacrylamide, and N-hydroxybutyl methacrylamide; N-alkoxyalkyl methacrylamides such as N-methoxymethyl methacrylamide, N-ethoxymethyl methacrylamide, N-(n-, iso)butoxymethyl methacrylamide, N-methoxyethyl methacrylamide, N-ethoxyethyl methacrylamide, and N-(n-,iso)butoxyethyl methacrylamide.

As a methacrylic acid derivative in the invention, from the viewpoint of suppression of secondary color image deformation, at least one selected from methacrylic acid esters and methacrylic acid is preferable, and at least one selected from methyl methacrylate, benzyl methacrylate, phenoxyethyl methacrylate, and methacrylic acid is more preferable.

The methacrylic acid derivative constituting the polymer in the invention may be used alone or two or more of the methacrylic acid derivatives may be used in combination.

Other monomers constituting a constituent unit other than a constituent unit derived from a methacrylic acid derivative constituting the polymer in the invention are not particularly limited as far as they are a monomer polymerizable with a methacrylic acid derivative, and examples include an acrylic acid derivative, a vinyl ester derivative, a styrene derivative, olefins (ethylene and the like), and an unsaturated polycarboxylic acid derivative (maleic acid, itaconic acid).

As the polymer particles in the invention, self-dispersing polymer particles are preferred and self-dispersing polymer particles having a carboxy group is more preferred, from the viewpoint of ejection stability and liquid stability (particularly, dispersion stability) in a case of using a coloring material (particularly, pigment), which will be described later. The self-dispersing polymer particles mean particles of a water-insoluble polymer which can form a dispersed state in an aqueous medium by means of a functional group (particularly, an acidic group or a salt thereof) of the polymer per se in the absence of other surfactant, and are water-insoluble polymer particles not containing a free emulsifier.

As used herein, the dispersed state include both of an emulsified state (emulsion) where a water-insoluble polymer is dispersed in a liquid state in an aqueous medium, and a dispersed state (suspension) where a water-insoluble polymer is dispersed in the solid state in an aqueous medium.

In the water-insoluble polymer of the invention, from the viewpoint of the aggregation rate and fixability when contained in the ink composition, a water-insoluble polymer which may be brought into the dispersed state where the water-insoluble polymer is dispersed in the solid state is preferable.

The dispersed state of the self-dispersing polymer particles in the invention means such a state where stable presence of a dispersed state can be observed visually at 25° C. for at least one week after mixing and stirring a solution in which 30 g of a water-insoluble polymer is dissolved into 70 g of an organic solvent (for example, methyl ethyl ketone), a neutralizing agent capable of neutralizing a salt-forming groups of the water-insoluble polymer to 100% (sodium hydroxide when the salt forming groups are anionic, or acetic acid when the groups are cationic), and 200 g of water (apparatus: a stirrer equipped with a stirring blade, number of rotation: 200 rpm, 30 min, 25° C.), and then removing the organic solvent from the liquid mixture.

Further, the water-insoluble polymer means such a polymer showing an amount of dissolution of 10 g or less when the polymer is dried at 105° C. for 2 hr and then dissolved in 100 g of water at 25° C. The amount of dissolution is, preferably, 5 g or less and, more preferably, 1 g or less. The amount of dissolution is the amount of dissolution when the polymer is neutralized with sodium hydroxide or acetic acid to 100% in accordance with the kind of the salt-forming group of the water-insoluble polymer.

The aqueous medium contains water and may contain a hydrophilic organic solvent, if necessary. In the invention, the aqueous medium preferably includes water and the hydrophilic organic solvent in an amount of 0.2 mass % or less relative to water and, more preferably, the aqueous medium consists of water.

The self-dispersing polymer particles in the invention preferably contain a water-insoluble polymer containing a hydrophilic constituent unit and a constituent unit derived from an aromatic group-containing monomer from the viewpoint of self-dispersibility.

The hydrophilic constituent unit is not particularly limited so long as it is derived from a hydrophilic group-containing monomer and it may be either a unit derived from one hydrophilic group-containing monomer or a unit derived from two or more hydrophilic group-containing monomers. The hydrophilic group is not particularly limited and it may be either a dissociative group or a nonionic hydrophilic group.

In the invention, the hydrophilic group is preferably a dissociative group from the viewpoints of promoting the self-dispersibility and stability of the formed emulsified or dispersed state and, more preferably, an anionic dissociative group. Examples of the dissociative group include a carboxy group, a phosphoric acid group, and a sulfonic acid group and, among them, a carboxy group is preferred from the viewpoint of fixing property when used in the ink composition.

The hydrophilic group-containing monomer in the invention is preferably a dissociative group-containing monomer and, preferably, a dissociative group-containing monomer having a dissociative group and an ethylenically unsaturated bond from the viewpoints of the self-dispersibility and aggregation property.

Examples of the dissociative group-containing monomer include an unsaturated carboxylic acid monomer, an unsaturated sulfonic acid monomer, and an unsaturated phosphoric acid monomer.

Specific examples of the unsaturated carboxylic acid monomer include acrylic acid, methacrylic acid, crotonic acid, itaconic acid, maleic acid, fumaric acid, citraconic acid, and 2-(methacryloyloxy)methyl succinicate, etc. Specific examples of the unsaturated sulfonic acid monomer include styrenesulfonic acid, 2-acrylamido-2-methylpropanesulfonic acid, 3-sulfopropyl(meth)acrylate, and bis(3-sulfopropyl) itaconate. Specific examples of the unsaturated phosphoric acid monomer include vinylphosphonic acid, vinylphosphate, bis(methacryloyloxyethyl) phosphate, diphenyl-2-acryloyloxyethyl phosphate, diphenyl-2-methacryloyloxyethyl phosphate, and dibutyl-2-acryloyloxyethyl phosphate.

Among the dissociative group-containing monomers, an unsaturated carboxylic acid monomer is preferred and, acrylic acid and methacrylic acid are more preferred from the viewpoints of the dispersion stability and ejection stability.

The self-dispersing polymer particles in the invention preferably contain a polymer having a carboxy group and contain, more preferably, a polymer having a carboxy group and an acid value (mgKOH/g) of from 25 to 120, from the viewpoints of the self-dispersibility and the aggregation rate when the ink composition containing the polymer particles is in contact with a treating liquid. The acid value is, more preferably, from 50 to 120 and, particularly preferably, from 60 to 110, from the viewpoints of the self-dispersibility and the aggregation rate when the ink composition containing the polymer particles is in contact with the treating liquid.

Particularly, when the acid value is 25 or more, the stability of the self-dispersibility may be more favorable, and when the acid value is 120 or less, the aggregation property may be improved.

The aromatic group-containing monomer is not particularly limited so long as it is a compound containing an aromatic group and a polymerizable group. The aromatic group may be either a group derived from an aromatic hydrocarbon or a group derived from an aromatic heterocycle. In the invention, the aromatic group is preferably an aromatic group derived from the aromatic hydrocarbon, from the viewpoint of shape stability of particles in the aqueous medium.

The polymerizable group may be either a polycondensating polymerizable group or an addition polymerizing polymerizable group. In the invention, the polymerizable group is preferably an addition polymerizing polymerizable group, and more preferably, a group containing an ethylenically unsaturated bond from the viewpoint of shape stability of particles in the aqueous medium.

The aromatic group-containing monomer in the invention is preferably a monomer having an aromatic group derived from an aromatic hydrocarbon and an ethylenically unsaturated bond. The aromatic group-containing monomer may be used alone or two or more of the monomers may be used in combination.

Examples of the aromatic group-containing monomer include phenoxyethyl (meth)acrylate, benzyl(meth)acrylate, phenyl(meth)acrylate, and styrene type monomer. Among them, from the viewpoint of the balance between the hydrophilicity and the hydrophobicity of the polymer chain and the ink fixing property, an aromatic group-containing (meth)acrylate monomer is preferred, and at least one selected from the group consisting of phenoxyethyl(meth)acrylate, benzyl (meth)acrylate, and phenyl (meth)acrylate is more preferably and, phenoxyethyl(meth)acrylate and benzyl (meth)acrylate are still more preferred.

"(Meth)acrylate" means acrylate or methacrylate.

The self-dispersing polymer particles in the invention are preferably acrylic polymer particles and preferably contain a constituent unit derived from the aromatic group-containing (meth)acrylate monomer and the content thereof is, preferably, from 10 mass % to 95 mass %. When the content of the aromatic group-containing (meth)acrylate monomer is from 10 mass % to 95 mass %, the stability of the self-emulsified or dispersed state is improved and, further, increase in the viscosity of an ink can be suppressed.

In the invention, the content of the aromatic group-containing (meth)acrylate monomer is, more preferably, from 15 mass % to 90 mass %, further preferably, from 15 mass % to 80 mass % and, particularly preferably, from 25 mass % to 70 mass % from the viewpoints of the stability of the self-dispersed state, stabilization for the shape of the particles in the aqueous medium due to hydrophobic inter-action between aromatic rings to each other, and lowering of the amount of the water-soluble component due to appropriate hydrophobic property of the particles.

The self-dispersing polymer particles in the invention can be formed by using, for example, a constituent unit derived from an aromatic group-containing monomer and a constituent unit derived from a dissociative group-containing monomer. The polymer particles may further contain other constituent units, if necessary.

The monomer which may be used for forming other constituent units is not particularly limited so long as it is a monomer copolymerizable with the aromatic group-containing monomer and the dissociative group-containing monomer. Among all, an alkyl group-containing monomer is preferred from the viewpoint of the flexibility of the polymer skeleton or easiness in control over the glass transition temperature (Tg).

Examples of the alkyl group-containing monomer include alkyl(meth)acrylates such as methyl(meth)acrylate, ethyl (meth)acrylate, isopropyl(meth)acrylate, n-propyl (meth) acrylate, n-butyl(meth)acrylate, isobutyl(meth)acrylate, t-butyl(meth)acrylate, hexyl (meth)acrylate, and ethylhexyl (meth)acrylate; ethylenically unsaturated monomers having a hydroxy group such as hydroxymethyl(meth)acrylate, 2-hydroxyethyl (meth)acrylate, 2-hydroxypropyl(meth)acrylate, 4-hydroxybutyl(meth)acrylate, hydroxypentyl(meth)acrylate, and hydroxyhexyl(meth)acrylate; dialkylamino alkyl (meth)acrylates such as dimethylaminoethyl(meth)acrylate; (meth)acrylamides, for example, N-hydroxyalkyl(meth) acrylamide such as N-hydroxymethyl(meth)acrylamide, N-hydroxyethyl(meth)acrylamide, and N-hydroxybutyl (meth)acrylamide; and N-alkoxyalkyl (meth)acrylamides such as N-methoxymethyl(meth)acrylamide, N-ethoxymethyl (meth)acrylamide, N-(n-, iso)butoxymethyl(meth) acrylamide, N-methoxyethyl (meth)acrylamide, N-ethoxyethyl(meth)acrylamide, and N-(n-,iso)butoxyethyl (meth) acrylamide.

A weight-average the molecular weight of the water-insoluble polymer that is used in the self-dispersing polymer particles in the invention is, preferably, from 3,000 to 200,000 and, more preferably, from 5,000 to 150,000 and, further preferably, from 10,000 to 100,000. The amount of the water-soluble component can be suppressed effectively by defining the weight average molecular weight to 3,000 or more. Further, the self-dispersion stability can be increased by defining the weight average molecular weight to 200,000 or less.

The weight average molecular weight is measured by gel permeation chromatography (GPC). In GPC, HLC-8020GPC (trade name, manufactured by Tosoh Corporation) is used, and 3 pieces of TSKgel Super Multipore HZ-H (trade name, manufactured by Tosoh Corporation, 4.6 mm ID×15 cm) were used as the columns, and THF (tetrahydrofuran) is used as an eluate. Measurement is performed by using an IR detector under the conditions at a sample concentration of 0.35 mass %, a flow rate of 0.35 mL/min, a sample ejection amount of 10 μL, and a measuring temperature of 40° C. A calibration curve is prepared based on eight samples of "standard sample: TSK standard polystyrene" of "F-40", "F-20", "F-4", "F-1", "A-5000", "A-2500", "A-1000", and "n-propylbenzene" manufactured by Tosoh Corporation.

The water-insoluble polymer used for the self-dispersing polymer particle in the invention preferably contains a structural unit derived from an aromatic group-containing (meth)acrylate monomer (preferably, a structural unit derived from phenoxyethyl (meth)acrylate and/or a structural unit derived from benzyl(meth)acrylate) at from 15 mass % to 80 mass % as the copolymerization ratio based on the entire mass of the self-dispersing polymer particles from the viewpoint of controlling the hydrophilicity and hydrophobicity of the polymer.

Further, the water-insoluble polymer preferably contains a constituent unit derived from an aromatic group-containing (meth)acrylate monomer by at 15 mass % to 80 mass % as the copolymerization ratio, a constituent unit derived from an anionic group-containing (preferably a carboxy group-containing) monomer, and a constituent unit derived from an alkyl group-containing monomer (preferably, a constituent unit derived from (meth)acrylic acid alkyl ester). The water-insoluble polymer more preferably contains a structural unit derived from phenoxyethyl(meth)acrylate and/or a structural unit derived from benzyl (meth)acrylate at from 15 mass % to 80 mass % as the copolymerization ratio, a constituent unit derived from an anionic group-containing (preferably a carboxy group-containing) monomer, and a constituent unit derived from an alkyl group-containing monomer (preferably, a structural unit derived from an ester of alkyl having 1 to 4 carbon atoms and (meth)acrylic acid). Further, the water-insoluble polymer has preferably an acid value of from 25 to 120 and a weight average molecular weight of from 3,000 to 200,000 and, more preferably, an acid value of from 50 to 120 and a weight average molecular weight of from 5,000 to 150,000, from the viewpoint of controlling the hydrophilicity and hydrophobicity of the polymer.

As specific examples of the water-insoluble polymer that is used in the self-dispersing polymer particle, exemplary compounds B-01 to B-07 are shown below but the invention is not limited to them. Nimerical values described in each parenthesis represents the mass ratio of the copolymer components.
B-01: methyl methacrylate/methoxyethyl acrylate/benzyl methacrylate/methacrylic
(methacrylic acid derivative ratio: 85 mass %)
B-02: methyl methacrylate/phenoxyethyl acrylate/benzyl methacrylate/acrylic
(methacrylic acid derivative ratio: 80 mass %)
B-03: phenoxyethyl acrylate/benzyl methacrylate/isobutyl methacrylate/methacrylic acid=16/35/43/6
(methacrylic acid derivative ratio: 84 mass %)
B-04: methyl methacrylate/phenoxyethyl methacrylate/benzyl methacrylate/methacrylic
(methacrylic acid derivative ratio: 100 mass %)
B-05: methyl methacrylate/benzyl acrylate/acrylic acid=70/25/5
(methacrylic acid derivative ratio: 70 mass %)
B-06: methyl methacrylate/benzyl acrylate/acrylic acid=65/30/5
(methacrylic acid derivative ratio: 65 mass %)
B-07: methyl methacrylate/benzyl acrylate/methacrylic acid=70/25/5
(methacrylic acid derivative ratio: 75 mass %)

The method of producing a water-insoluble polymer that is used in the self-dispersing polymer particle in the invention is not particularly limited. Examples of the method of producing the water-insoluble polymer include a method of performing emulsion polymerization under the presence of a polymerizable surfactant thereby covalently-bonding the surfactant and the water-insoluble polymer and a method of copolymerizing a monomer mixture containing the hydrophilic group-containing monomer and the aromatic group-containing monomer by a known polymerization method such as a solution polymerization method or a bulk polymerization method. Among the polymerization methods described above, the solution polymerization method is preferred and a solution polymerization method of using an organic solvent is more preferred from the viewpoint of aggregation rate and the stability of droplet ejection when contained in an ink composition.

From the viewpoint of the aggregation rate, the self-dispersing polymer particle in the invention preferably includes a polymer synthesized in an organic solvent, and it is preferable that the polymer has an anionic group (preferable, a carboxy group, preferably, the acid value is 20 to 100), and the particle is prepared as a polymer dispersion in which a part or all of the anionic groups (e.g. carboxy group) of the polymer is neutralized, and water is the continuous phase. Namely, it is preferable that the self-dispersing polymer particle in the invention is produced by providing a step of synthesizing a polymer in an organic solvent, and a dispersing step of preparing an aqueous dispersion in which at least a part of the anionic groups (e.g. carboxy groups) of the polymer is neutralized.

The dispersion step preferably includes the following step (1) and step (2).

Step (1): step of stirring a mixture containing a polymer (water-insoluble polymer), an organic solvent, a neutralizing agent, and an aqueous medium, Step (2): step of removing the organic solvent from the mixture.

The step (1) is preferably a treatment that includes at first dissolving the polymer (water-insoluble polymer) in the organic solvent and then gradually adding the neutralizing agent and the aqueous medium, and mixing and stirring them to obtain a dispersion. By adding the neutralizing agent and the aqueous medium to the solution of the water-insoluble polymer dissolved in the organic solvent, self-dispersing polymer particles having a particle size that enables higher storage stability can be obtained without requiring strong sharing force.

The stirring method for the mixture is not particularly limited and a mixing and stirring apparatus that is used generally can be used, and if necessary, a disperser such as a ultrasonic disperser or a high pressure homogenizer can be used.

Preferable examples of the organic solvent include alcohol type solvents, ketone type solvents and ether type solvents.

Examples of the alcohol type solvent include isopropyl alcohol, n-butanol, t-butanol, and ethanol. Examples of the ketone type solvent include acetone, methyl ethyl ketone, diethyl ketone, and methyl isobutyl ketone. Examples of the ether type solvent include dibutyl ether and dioxane. Among the solvents, the ketone type solvent such as methyl ethyl ketone and the alcohol type solvent such as propyl alcohol are preferred. Further, with an aim of moderating the change of polarity at the phase transfer from an oil system to an aqueous system, combined use of isopropyl alcohol and methyl ethyl ketone is also preferred. By the combined use of the solvents, self-dispersing polymer particles of fine particle size with no aggregation settling or fusion between particles to each other and having high dispersion stability may be obtained.

The neutralizing agent is used to partially or entirely neutralize the dissociative groups so that the self-dispersing polymer can form a stable emulsified or dispersed state in water. In the case where the self-dispersing polymer of the invention has an anionic dissociative group (for example, a carboxy group) as the dissociative group, examples of the neutralizing agent to be used include basic compounds such as organic amine compounds, ammonia, and alkali metal hydroxides. Examples of the organic amine compounds include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-diethylamino-2-methyl-1-propanol, 2-amino-2-methyl-1-propanol, N-methyldiethanolamine, N-ethyldiethanolamine, monoisopropanolamine, diisopropanolamine, and triisopropanolamine, etc. Examples of the alkali metal hydroxide include lithium hydroxide, sodium hydroxide and potassium hydroxide. Among them, sodium hydroxide, potassium hydroxide, triethylamine, and triethanolamine are preferred from the viewpoint of the stabilization of dispersion of the self-dispersing polymer particles of the invention into water.

These basic compounds are preferably used at 5 mol % to 120 mol %, more preferably 10 mol % to 110 mol %, and further preferably 15 mol % to 100 mol % based on 100 mol % of the dissociative groups. By adopting 15 mol % or more, the effect of stabilizing dispersion of the particle in water is realized and, by adopting 100 mol % or less, there is the effect of reducing the amount of the water-soluble components, and suppressing the increase in the viscosity.

In the step (2), an aqueous dispersion of the self-dispersing polymer particles can be obtained by phase transfer to the aqueous phase by distilling off the organic solvent from the dispersion obtained in the step (1) by a common method such as distillation under a reduced pressure. In the obtained aqueous dispersion, the organic solvent has been substantially removed and the amount of the organic solvent is preferably 0.2 mass % or less and, more preferably, 0.1 mass % or less.

The average particle diameter of the polymer particles (particularly, self-dispersing polymer particles) is, preferably, in a range from 1 nm to 400 nm, more preferably in a range from 1 nm to 200 nm, further preferably, in a range from 1 nm to 100 nm and, particularly preferably, in a range from 1 nm to 50 nm as the volume average particle diameter. The production adaptability may be improved when the average particle diameter is 10 nm or more. Increase in the viscosity of the aqueous dispersion may be suppressed, and handling may be improved, when the average particle diameter is 1 nm or more. The storage stability may be improved when the average particle diameter is 400 nm or less. The particle diameter distribution of the polymer particles is not particularly limited and it may be either a wide particle diameter distribution or a monodispersed particle diameter distribution. Further, two or more types of water-insoluble particles may be used in admixture.

The average particle diameter and the particle diameter distribution of the polymer particles can be determined by measuring the volume average particle diameter by means of a dynamic light scattering method using a particle size distribution measuring apparatus NANOTRACKUPA-EX150 (trade name, manufactured by Nikkiso Co., Ltd.).

The content of the polymer particle (particularly, self-dispersing polymer particles) in mass % the ink composition is, preferably, from 1 mass % to 30 mass % and, more preferably, from 5 to 15 mass % relative to the ink composition, from the viewpoint of the glossiness of an image.

The polymer particles (particularly, self-dispersing polymer particles) can be used alone or two or more kinds of the polymer particles can be used in admixture.

The ratio of the amount of the coloring material contained in the ink composition relative to the amount of the polymer particle (preferably, self-dispersing polymer particle) (coloring material/polymer particle) is preferably from 1/0.5 to 1/10, and more preferably from 1/1 to 1/4, from the view point of scratching resistance of an image.

(Coloring Material)

The ink composition in the invention contains at least one coloring material. It is preferable that the coloring material is a water-insoluble coloring material. By adding a water-insoluble coloring material into the ink composition, the ink coloring property becomes good, and a visible image which is good in color density and hue may be recorded.

The water-insoluble coloring material refers to a material which is almost insoluble or hardly soluble in water and, specifically, refers to a material which has the amount soluble in water at 25° C. of 0.5 mass % or less.

As a coloring material component constituting the water-insoluble coloring material, known dyes and pigments may be used without any limitation. Specifically, examples include various pigments, disperse dyes, oil-soluble dyes, and coloring matters which form a J-associate, and pigments are preferable.

In the invention, the water-insoluble pigment itself, or the water-insoluble pigment whose surface is treated by a dispersant may be contained as the water-insoluble coloring material.

The pigment is not particularly limited in its kind, and any one of known organic pigments and known inorganic pigments may be used. Examples of the pigment that may be used include polycyclic pigments such as an azo lake, an azo pigment, a phthalocyanine pigment, a perylene pigment and a perynone pigment, an anthraquinone pigment, a quinacridone pigment, a dioxadine pigment, a diketopyrrolopyrrole pigment, a thioindigo pigment, an isoindoline pigment and a quinophthalone pigment; dye lakes such as basic dye type lakes and acidic dye type lakes; organic pigments such as a nitro pigment, a nitroso pigment, aniline black and a daylight fluorescent pigment; and inorganic pigments such as titanium oxide, iron oxide type and carbon black type. Even pigments that are not described in Color Index can be used so long as it is a pigment capable of being dispersed in an aqueous phase. Furthermore, those obtained by surface treating the above-described pigments with a surfactant, a polymeric dispersant or the like, and grafted carbon can also be used.

Among those pigments, an azo pigment, a phthalocyanine pigment, an anthraquinone pigment, a quinacridone pigment and a carbon black type pigment are preferably used.

Specific examples of the organic pigment that may be used in the invention will be described below.

Examples of the organic pigment for orange or yellow include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 151, C.I. Pigment Yellow 155, C.I. Pigment Yellow 180 and C.I. Pigment Yellow 185.

Examples of the organic pigment for magenta or red include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 222 and C.I. Pigment Violet 19.

Examples of the organic pigment for green or cyan include C.I. Pigment Blue 15, C.I. Pigment Blue 15:2, C.I. Pigment Blue 15:3, C.I. Pigment Blue 15:4, C.I. Pigment Blue 16, C.I. Pigment Blue 60, C.I. Pigment Green 7, and siloxane-crosslinked aluminum phthalocyanine described in U.S. Pat. No. 4,311,775.

Examples of the organic pigment for black include C.I. Pigment Black 1, C.I. Pigment Black 6 and C.I. Pigment Black 7.

(Dispersant)

When a pigment is used as the coloring material, the pigment is preferably dispersed in an aqueous solvent by a dispersant. The dispersant may be a polymer dispersant, or a low molecular-weight surfactant type dispersant. The polymer dispersant may be either one of a water-soluble dispersant or a water-insoluble dispersant.

The low molecular-weight surfactant type dispersant (hereinafter sometimes referred to as a "low molecular-weight dispersant") can be added for the purpose of stably dispersing the organic pigment in an aqueous solvent while maintaining an ink in low viscosity. The low molecular-weight dispersant used herein means a low molecular-weight dispersant having a molecular weight of 2,000 or lower. The molecular weight of the low molecular-weight dispersant is preferably from 100 to 2,000, and more preferably from 200 to 2,000.

The low molecular-weight dispersant has a structure containing a hydrophilic group and a hydrophobic group. At least one hydrophilic group and at least one hydrophobic group may be independently contained in one molecule, and the low molecular-weight dispersant may have plural hydrophilic groups and prural hydrophobic groups. The low molecular-weight dispersant can appropriately have a linking group for linking the hydrophilic group and the hydrophobic group.

Examples of the hydrophilic group include an anionic group, a cationic group, a nonionic group, and a betaine type combining those.

The anionic group is not particularly limited so long as it has a negative charge. A phosphoric acid group, a phosphonic acid group, a phosphinic acid group, a sulfuric acid group, a sulfonic acid group, a sulfinic acid group and a carboxylic acid group are preferred, a phosphoric acid group and carboxyl group are more preferred, and a carboxylic acid group is further preferred.

The cationic group is not particularly limited so long as it has a positive charge. An organic cationic substituent is preferred, a cationic group containing nitrogen or phosphorus is more preferred, and a cationic group having nitrogen is further preferred. Above all, pyridinium cation and ammonium cation are particularly preferred.

The nonionic group is not particularly limited so long as it does not have negative or positive charge. Examples of the nonionic group include polyalkylene oxide, polyglycerin and a part of sugar unit It is preferred in the invention that the hydrophilic group is an anionic group from the standpoints of dispersion stability and aggregation properties of a pigment.

When the low molecular-weight dispersant has an anionic hydrophilic group, its pKa is preferably 3 or more from the standpoint of accelerating an aggregation reaction when contained with an acidic treating liquid. The pKa of the low molecular-weight dispersant herein is a value experimentally obtained from a titration curve by titrating a liquid obtained dissolving 1 mmol/L of a low molecular-weight dispersant in a tetrahydrofuran-water=3:2 (V/V) solution, with an acid or alkali aqueous solution.

Theoretically, when pKa of a low molecular-weight dispersant is 3 or more, 50% or more of anionic groups are in a non-dissociation state when contacted with a treating liquid having a pH of about 3. Therefore, water solubility of the low molecular-weight dispersant is remarkably decreased, and an aggregation reaction occurs. In other words, aggregation reactivity is improved. From this standpoint, it is preferred that the low molecular-weight dispersant has a carboxylic acid group as an anionic group.

On the other hand, the hydrophobic group may have any structure of hydrocarbon type, fluorocarbon type, silicone type and the like, and the hydrocarbon type is particularly preferred. Those hydrophobic groups may have any of a linear structure and a branched structure. The hydrophobic group may have a structure of one chain or a structure of two or more chain structure. When the structure has two or more chains, the structure may have plural hydrophobic groups.

The hydrophobic group is preferably a hydrocarbon group having from 2 to 24 carbon atoms, more preferably a hydrocarbon group having from 4 to 24 carbon atoms, and further preferably a hydrocarbon group having from 6 to 20 carbon atoms.

Among the polymer dispersants, a hydrophilic polymer may be used as the water-soluble dispersant. Examples of a natural hydrophilic polymer include vegetable polymers such as gum Arabic, gum tragacanth, gum guar, gum karaya, locust bean gum, arabinogalactan, pectin and quince seed starch; seaweed polymers such as alginic acid, carrageenan and agar; animal polymers such as gelatin, casein, albumin and collagen; and microbial polymers such as xanthene gum and dextran.

Examples of a chemically modified hydrophilic polymer using a natural product as a raw material include cellulose polymers such as methyl cellulose, ethyl cellulose, hydroxyethyl cellulose, hydroxypropyl cellulose and carboxymethyl cellulose; starch polymers such as sodium starch glycolate and sodium starch phosphate ester; and seaweed polymers such as propylene glycol alginate.

Examples of a synthetic water-soluble polymer include vinyl polymers such as polyvinyl alcohol, polyvinyl pyrrolidone and polyvinyl methyl ether; acrylic resins such as polyacrylamide, polyacrylic acid or an alkali metal salt thereof, and water-soluble styrene acrylic resin; water-soluble styrene maleic acid resins; water-soluble vinylnaphthalene acrylic resins; water-soluble vinylnaphthalene maleic resins; polyvinyl pyrrolidone, polyvinyl alcohol, alkali metal salts of β-naphthalenesulfonic acid formalin condensate; and polymers having a salt of a cationic functional group such as quaternary ammonium or amino group at a side chain thereof.

Among these, a polymer containing a carboxy group is preferred from the standpoints of dispersion stability and aggregation properties of pigment. Polymers containing a carboxyl group, such as acrylic resins such as water-soluble styrene acrylic resin; water-soluble styrene maleic acid resin; water-soluble vinylnaphthalene acrylic resin; and water-soluble vinylnaphthalene maleic acid resin are particularly preferred.

Among the polymer dispersants, as a water-insoluble dispersant, a polymer having both a hydrophilic moiety and a hydrophobic moiety may be used. Examples of such a polymer include styrene-(meth)acrylic acid copolymer, styrene-(meth)acrylic acid-(meth)acrylic acid ester copolymer, (meth)acrylic acid ester-(meth)acrylic acid copolymer, polyethylene glycol (meth)acrylate-(meth)acrylic acid copolymer and styrene-maleic acid copolymer.

The polymer dispersant preferably has a weight average molecular weight of from 3,000 to 200,000, more preferably from 5,000 to 100,000, further preferably from 5,000 to 80,000, and particularly preferably from 10,000 to 60,000.

Mixing mass ratio of a pigment to a dispersant (pigment: dispersant) is preferably in a range of from 1:0.06 to 1:3, more preferably in a range of from 1:0.125 to 1:2, and further preferably in a range of from 1:0.125 to 1:1.5.

When a dye is used as the coloring material, a material in which a water-insoluble carrier supports a dye can be used as water-insoluble coloring material. As the dye, conventional dyes may be used without particular limitation. For example, dyes described in JP-A No. 2001-115066, JP-A No. 2001-335714 and JP-A No. 2002-249677 can preferably be used in the invention. The carrier used is not particularly limited so long as it is insoluble or slightly soluble in water, and inorganic materials, organic materials and their composite materials can be used. Specifically, carriers described in, for example, JP-A No. 2001-181549 and JP-A No. 2007-169418 can preferably be used in the invention.

The carrier supporting a dye (water-insoluble coloring material) can be used as an aqueous dispersion using a dispersant. As the dispersant, any of the dispersants described hereinabove can be preferably used.

The coloring material preferably, contains a pigment and a dispersant, more preferably an organic pigment and a polymer dispersant, and particularly preferably an organic pigment and a polymer dispersant containing a carboxy group from the viewpoint of light fastness and quality of an image. Among them, as for the water-insoluble coloring material, from the viewpoint of aggregating property and consequently ink fixability, the coloring material (preferably, pigment) is preferably a water-insoluble coloring material covered with a polymer dispersant (preferably, having a carboxy group) and, further, the pigment is preferably a water-insoluble pigment covered with an acryl-based polymer. As the acryl-based polymer, for example, an acrylic resin such as a water-soluble styrene acrylic resin, a water-soluble styrene maleic acid resin, a water-soluble vinylnaphthalene acrylic resin, and a water-soluble vinylnaphthalene maleic acid resin are preferable.

Further, from the viewpoint of aggregating property, the acid value of the polymer dispersant is preferably higher than the acid value of the polymer particle (preferably a self-dispersing polymer particle).

The average particle diameter (volume average particle diameter) of the coloring material is preferably from 10 nm to 200 nm, more preferably from 10 nm to 150 nm, further preferably from 10 nm to 100 nm. When the average particle diameter is 200 nm or less, color reproductivity becomes good, and droplet ejection property when ejected by an ink jet method becomes good and, when the diameter is 10 nm or more, light fastness becomes good. The particle diameter distribution of the coloring material is not particularly limited, and it may be a wide particle diameter distribution or a monodispersed particle diameter dispersion. Further, two or more coloring materials may be used by mixing them.

The volume average particle diameter and the particle diameter distribution of the polymer particles can be determined by measuring by a dynamic light scattering method, using a Nanotrack particle size distribution measuring apparatus UPA-EX150 (trade name, manufactured by Nikkiso Co., Ltd.).

The content of the water-insoluble coloring material in the ink composition, is preferably from 1 mass % to 25 mass %, more preferably from 2 mass % to 20 mass %, further preferably from 5 mass % to 20 mass %, and particularly preferably from 5 mass % to 15 mass % based on the ink composition from the viewpoint of the image density.

The water-insoluble coloring material may be used alone, or two or more of them may be used in combination.

(Hydrophilic Organic Solvent)

The ink composition in the invention contains water as a solvent, and preferably further contains at least one hydrophilic organic solvent. By containing the hydrophilic organic solvent, drying can be prevented and permeation can be prevented. When the hydrophilic organic solvent is used as a drying preventing agent, clogging of a nozzle which may occur by dried ink at an ink ejection port may be effectively prevented upon image recording by ejecting the ink composition by an ink jet method.

A hydrophilic organic solvent having vapor pressure lower than that of water may be preferably used for prevention of drying. Specific examples of the hydrophilic organic solvent include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylolpropane; lower alkyl ethers of polyhydric alcohol, such as ethylene glycol monomethyl(or ethyl)ether, diethylene glycol monomethyl(or ethyl)ether and triethylene glycol monoethyl(or butyl)ether; heterocycles such as 2-pyrrolidone, N-methyl-2-pyrrolidone, 1,3-dimethyl-2-imidazolidinone and N-ethylmorpholine; sulfur-containing compounds such as sulfolane, dimethylsufoxide and 3-sulforene; polyfunctional compounds such as diacetone alcohol and diethanolamine; and urea derivatives.

Among the hydrophilic organic solvents, polyhydric alcohols such as glycerin and diethylene glycol are preferred. The hydrophilic organic solvents may be used alone or as mixtures of two or more of them. The hydrophilic organic solvent is preferably contained in an amount of from 10 mass % to 50 mass % in the ink composition.

To promote permeation, from the viewpoint of better permeation of the ink composition into a recording medium, a hydrophilic organic solvent is suitably used. Examples of the hydrophilic organic solvent suitable for permeation promotion include alcohols such as ethanol, isopropanol, butanol, di(tri)ethylene glycol monobutyl ether, and 1,2-hexanediol. Sodium laurylsulfate, sodium oleate, and nonionic surfactants are also suitably used for permeation promotion. When the hydrophilic organic solvent is contained in the ink composition at 5 mass % to 30 mass %, better effect is obtained. In addition, it is preferable that the hydrophilic organic solvent is used in an addition amount range that blur of printing/image and print through are not caused.

The hydrophilic organic solvent can be used to adjust viscosity, other than the above. Specific examples of the hydrophilic organic solvent that can be used to adjust viscosity include alcohols (for example, methanol, ethanol, propanol, isopropanol, butanol, isobutanol, sec-butanol, t-butanol, pentanol, hexanol, cyclohexanol and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether and ethylene glycol monophenyl ether), amines (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine and tetramethylpropylenediamine), and other polar solvents (for example, formaldehyde, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone).

The hydrophilic organic solvent may be used alone or as mixtures of two or more of them.

(Surfactant)

The ink composition in the invention contains at least one surfactant. The surfactant is used as a surface tension regulator. Examples of the surface tension regulator include nonionic surfactants, cationic surfactants, anionic surfactants, and betaine surfactants.

For improving the ink droplet ejection by the ink-jet method, the surfactant is preferably contained in such an amount that the surface tension of the ink composition can be controlled to 20 mN/m to 60 mN/m. The content of the surfactant is more preferably in an amount capable of controlling the surface tension to 20 mN/m to 45 mN/m and, more preferably, in an amount capable of controlling the surface tension to 25 mN/m to 40 mN/m.

The surface tension of the ink composition is measured by a plate method under the condition at 25° C. using Automatic Surface Tensiometer: CBVP-Z (trade name, manufactured by Kyowa Interface Science Co., Ltd.).

Specific examples of the surfactant as a hydrocarbon type preferably include anionic surfactants such as fatty acid salts, alkyl sulfuric acid ester salts, alkyl benzenesulfonates, alkyl naphthalenesulfonates, dialkyl sulfosuccinates, alkyl phosphoric acid ester salts, naphthalenesulfonic acid-formalin condensates and polyoxyethylene alkyl sulfuric acid salts; and nonionic surfactants such as polyoxyethylene alkyl ether, polyoxyethylene alkyl allyl ether, polyoxyethylene fatty acid ester, sorbitan fatty acid ester, polyoxyethylene sorbitan fatty acid ester, polyoxyethylene alkyl amine, glycerin fatty acid ester and oxyethylene oxypropylene block copolymer. SURFYNOLS (trade name, products of Air Products & Chemicals) and OLFINE E1010 (trade name, surfactant, manufactured by Nisshin Chemical Industry Co., Ltd) which are an acetylene type polyoxyethylene oxide surfactant) are preferably used. Furthermore, amine oxide type amphoteric surfactants such as N,N-dimethyl-N-alkyl amine oxide are preferred.

Additionally, materials described on pages (37) to (38) of JP-A No. 59-157636 and Research Disclosure No. 308119 (1989) as surfactants can be used.

When fluorocarbon (alkyl fluoride type) surfactants, silicone surfactants or the like, such as those described in JP-A Nos. 2003-322926, 2004-325707 and 2004-309806 are used, scratch fastness can be improved.

The surface tension regulator can be used as an antifoamer, and fluorine compounds, silicone compounds, chelating agents represented by EDTA, and the like can be used.

(Water)

It is preferable that the ink composition in the invention contains water. The amount of water to be contained is not particularly limited. The content of water in the invention is preferably from 10 mass % to 99 mass %, more preferably from 30 mass % to 80 mass %, and further preferably from 50 mass % to 70 mass %.

(Other Additives)

The ink composition used in the invention may contain other additives, in addition to the components described above. Examples of other additives that may be used in the invention include conventional additives such as a color fading inhibitor, emulsion stabilizer, permeation accelerator, ultraviolet absorber, preservative, mildew-proofing agent, pH adjusting agent, defoamer, viscosity adjusting agent, dispersant, dispersion stabilizer, anti-rust agent and chelating agent. These various additives may directly be added after preparation of the ink composition, or may be added at the time of preparation of the ink composition.

The ultraviolet absorber is used for the purpose of improving strorability of an image. The ultraviolet absorber includes benzotriazole compounds described in, for example, JP-A Nos. 58-185677, 61-190537, 2-782, 5-197075 and 9-34057; benzophenone compounds described in, for example, JP-A Nos. 46-2784 and 5-194483, and U.S. Pat. No. 3,214,463; cinnamic acid compounds described in, for example, Japanese Patent Application Publication (JP-B) Nos. 48-30492 and 56-21141, and JP-A No. 10-88106; triazine compounds described in, for example, JP-A Nos. 4-298503, 8-53427, 8-239368 and 10-182621, and Japanese National Phase Publication No. 8-501291; compounds described in Research Disclosure No. 24239; and compounds that absorb ultraviolet light and emit fluorescence, i.e., fluorescent brighteners, represented by stilbene compounds or benzoxazole compounds.

The color fading inhibitor is used for the purpose of improving storability of an image. Examples of the color fading inhibitor that can be used include various organic color fading inhibitors and metal complex color fading inhibitors. Examples of the organic color fading inhibitor include hydroquinones, alkoxyphenols, dialkoxyphenols, phenols, anilines, amines, indanes, chromanes, alkoxyanilines and heterocycles. Examples of the metal complex color fading inhibitor include a nickel complex and a zinc complex. More specifically, compounds described in the patents cited in Research Disclosure No. 17643, chapter VII, items I to J; Research Disclosure No. 15162: Research Disclosure No. 18716, page 650, the left-hand column; Research Disclosure No. 36544, page 527; Research Disclosure No. 307105, page 872; and Research Disclosure No. 15162, and compounds included in the formulae of the representative compounds and the exemplified compounds described on pages 127 to 137 of JP-A No. 62-215272 can be used.

Examples of the mildew-proofing agent include sodium dehydroacetate, sodium benzoate, pyridinethione-1-oxide sodium salt, p-hydroxybenzoic acid ethyl ester, 1,2-benzisothiazol-3-one and salts thereof. It is preferable that these are used in the ink composition at 0.02 mass % to 1.00 mass %.

As the pH adjusting agent, a neutralizing agent (organic base, inorganic alkali) may be used. The pH adjusting agent, is preferably added so that a pH of the ink composition becomes 6 to 10, and more preferably 7 to 10 from the viewpoint of improvement in storage stability of the ink composition.

With a view point of ejection stability when the ink composition is ejected by the ink-jet method and the aggregation rate when the ink composition is used with the treating liquid to be described later, the viscosity of the liquid composition in the invention is preferably, in a range from 1 mPa·s to 30 mPa·s, more preferably, in a range from 1 mPa·s to 20 mPa·s, further preferably, in a range from 2 mPa·s to 15 mPa·s and, particularly preferably, in a range from 2 mPa·s to 10 mPa·s, The viscosity of the ink composition is measured by using VISCOMETER TV-22 (trade name, manufactured by TOKI SANGYO CO., LTD.) under the condition at 20° C.

—Treating Liquid—

The treating liquid in the invention is an aqueous composition which form an aggregate when contacted with the ink composition, and specifically, contains at least an aggregating component which may aggregate the dispersed particles such as the particles of coloring material (pigment etc.) in the ink composition to form an aggregate and, if necessary, may contain other components. By using the treating liquid together with the ink composition, ink jet recording may be speeded up and, even when high speed recording is performed, an image having high density and high resolution is obtained.

(Aggregating Components)

The treating liquid contains at least one aggregating component which form an aggregate when contacted with the ink composition. By mixing of the treating liquid into the ink composition ejected by an ink jet method, aggregation of a pigment or the like which has been stably dispersed in the ink composition is promoted.

Examples of the treating liquid include a liquid which may generate an aggregate by changing a pH of the ink composition. Thereupon, a pH (25° C.±1° C.) of the treating liquid is preferably from 0.5 to 6, more preferably from 0.5 to 4, and further preferably from 1 to 4 from the viewpoint of the aggregation rate of the ink composition. In this case, a pH (25° C.±1° C.) of the ink composition used in the ejection step is preferably 7.5 to 9.5 (more preferably 8.0 to 9.0).

In the invention, it is preferable that a pH (25° C.) of the ink composition is 7.5 or higher, and a pH (25° C.) of the treating liquid is 1 to 4, from the viewpoint of the image density, the resolution, and speed-up of ink jet recording.

The aggregating component may be used alone, or two or more of them may be used by mixing them.

The treating liquid may be prepared by using at least one acidic compound as the aggregating component. As the acidic compound, compounds having a phosphoric acid group, a phosphonic acid group, a phosphinic acid group, a sulfuric acid group, a sulfonic acid group, a sulfinic acid group, or a carboxy group, or salts thereof (e.g. polyvalent metal salts) may be used. Among them, from the viewpoint of the aggregation rate of the ink composition, compounds having a phosphoric acid group or a carboxy group are more preferable, and compounds having a carboxy group are further preferable.

The compound having a carboxy group is preferably selected from polyacrylic acid, acetic acid, glycoric acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrole carboxylic acid, furan carboxylic acid, pyridine carboxylic acid, coumalic acid, thiophene carboxylic acid, nicotinic acid, or derivatives of such compound or salts thereof (for example, polyvalent metal salts, etc.) One of these compounds may be used alone or two or more of these compounds may be used together.

The treating liquid in the invention may further include an aqueous solvent (for example, water) in addition to the acidic compound described above.

The content of the acidic compound in the treating liquid is, preferably, from 5 mass % to 95 mass % and, more preferably, from 10 mass % to 80 mass % based on the entire mass of the treating liquid from the viewpoint of aggregation effect.

Preferred examples of the treating liquid that may improve the high speed aggregation property include a treating liquid including a polyvalent metal salt or a polyallyl amine. Examples of the polyvalent metal salt and a polyallyl amine include salts of alkaline earth metals belonging to group 2 of the periodic table (for example, magnesium and calcium), salts of a transition metal belonging to group 3 of the periodic table (for example, lanthanum), salts of a cation of a metal belonging to group 13 of the periodic table (for example, aluminum), salts of a lanthanide (for example, neodium), polyallylamine and polyallylamine derivatives. As the metal salts, carboxylic acid salts (such as, salts of formic acid, salts of acetic acid, and salts of benzoic acid), nitric acid salts, chlorides, and thiocyanic acid salts are preferred, and calcium salts or magnesium salt of a carboxylic acid (such as salts of formic acid, salts of acetic acid, and salts of benzoic acid), calcium salt of nitric acid or magnesium salt of nitric acid, calcium chloride, magnesium chloride, and calcium salt of thiocyanic acid or magnesium salt of thiocyanic acid are more preferred.

The content of the metal salt in the treating liquid is preferably from 1 mass % to 10 mass %, more preferably, from 1.5 mass % to 7 mass % and, further preferably, from 2 mass % to 6 mass %.

The viscosity of the treating liquid is, preferably, in a range from 1 mPa·s to 30 mPa·s, more preferably, in a range from 1 mPa·s to 20 mPa·s, further preferably, in a range from 2 mPa·s to 15 mPa·s, and, particularly preferably, in a range from 2 mPa·s to 10 mPa·s from the viewpoint of the aggregation rate of the ink composition. The viscosity is measured by using VISCOMETER TV-22 (trade name, manufactured by TOKI SANGYO CO., LTD.) under the condition at 20° C.

The surface tension of the treating liquid is, preferably, from 20 mN/m to 60 mN/m, more preferably, from 20 mN/m to 50 mN/m and, further preferably, from 25 mN/m to 45 mN/m from the viewpoint of the aggregation rate of the ink composition. The surface tension is measured by using Automatic Surface Tensiometer CBVP-Z (trade name, manufactured by Kyowa Interface Science Co. Ltd.) under the condition at 25° C.

<Ink Jet Recording Method>

The ink jet recording method of the invention includes at least a treating liquid applying step of applying the aforementioned treating liquid which form an aggregate when contacted with an ink composition, on a recording medium, and an ink applying step of applying the aforementioned ink composition on the recording medium by an ink jet system and, if necessary, may includes other steps.

The ink composition in the ink jet recording method of the invention contains at least of a polymer particle having 65 mass % or more of a constituent unit derived from a methacrylic acid derivative, and a coloring material. Details and preferable embodiments of each component are as described above.

The treating liquid may be prepared by using an aggregating component, and details and preferable embodiments of each component are as described above.

In the ink jet recording method of the invention, upon construction of a recording system of acting a treating liquid which form an aggregate with an ink composition containing a coloring polymer and a polymer particle, on the ink composition, to form an image, by adopting a construction that a polymer particle in the ink composition contains 65 mass % of a constituent unit derived from a methacrylic acid derivative, coloring material movement may be suppressed when plural ink compositions are contacted with each other or piled on the same recording medium, and the color density and the hue of a recorded image are improved.

Each step constituting the ink jet recording method of the invention will be explained below.

—Ink Applying Step—

The ink applying step applies the aforementioned ink composition on a recording medium by an ink jet method. In the present step, the ink composition may be selectively applied on the recording medium, and a desired visible image may be formed. Details of the ink composition are as described above.

Image recording utilizing the ink-jet method can be performed, specifically, by supplying energy thereby ejecting a liquid composition to a desired recording medium, that is, plain paper, resin-coated paper, paper used exclusively for ink-jet recording described, for example, in JP-A Nos. 8-169172, 8-27693, 2-276670, 7-276789, 9-323475, 62-238783, 10-153989, 10-217473, 10-235995, 10-337947, 10-217597, and 10-337947, films, common use paper for electrophotography, clothes, glass, metals, ceramics, etc. As the ink-jet recording method suitable to the invention, a method described in JP-A No. 2003-306623, in columns (0093) to (0105) may be applicable.

The ink-jet method is not particularly limited and may be of any known system, for example, a charge control system of ejecting an ink utilizing an electrostatic attraction force, a drop on demand system of utilizing a vibration pressure of a piezo element (pressure pulse system), an acoustic ink-jet system of converting electric signals into acoustic beams, irradiating them to an ink, and ejecting the ink utilizing a radiation pressure, and a thermal ink-jet system of heating an ink to form bubbles and utilizing the resultant pressure (BUBBLEJET®). Examples of the ink-jet method include a system of injecting a number of ink droplets of low concentration, a so-called "photo-ink" each in a small volume, a system of improving an image quality using plural inks of a substantially identical hue and of different concentrations, and a system of using a colorless transparent ink.

The ink-jet head used in the ink-jet method may be either an on-demand system or a continuous system. The ejection system includes, specifically, for example, an electric-mechanical conversion system (for example, single cavity type, double cavity type, bender type, piston type, share mode type, and shared wall type, etc.), an electric-thermal conversion system (for example, thermal ink-jet type, BUBBLEJET® type, etc.), an electrostatic attraction system (for example, electric field control type, and slit jet type, etc.), and an electric ejecting system (for example, spark jet type, etc.) and any of the ejection systems may be used.

Ink nozzles, etc. used for recording by the ink-jet method are not particularly limited but can be selected properly depending on the purpose.

Examples of the ink-jet head include an ink-jet head of a shuttle system in which a short serial head is used and recording is performed while allowing the head to scan in the lateral direction of a recording medium, and an ink jet head of a line system in which a line head in which recording elements are arranged corresponding to the entire region for one side of a recording medium is used. In the line system, an image can be recorded over the entire surface of the recording medium by allowing the recording medium to be scanned in the direction being at right angles to the direction of arranging the recording elements, in which a transportation system such as a carriage by which the short head moves for scanning is not necessary. Further, since complicate scanning control for the movement of the carriage and the recording medium is not necessary and only the recording medium is moved, higher recording speed can be attained as compared with the shuttle system. While the ink-jet recording method of the invention is applicable to any one of them, the effect of improving the ejection accuracy and the scratch resistance of the image is generally remarkable when the ink-jet recording method is applied to the line system without performing dummy jetting.

The ink applying step in the invention includes a first ink applying step of applying a first ink composition on a recording medium, and a second ink applying step of applying a second ink composition different from the first ink composition on the recording medium within 1 second (preferably within 0.6 seconds, and more preferably within 0.4 seconds) from the application of the first ink composition, and it is preferable that at least one of the first ink applying step or the second ink applying step is a step of ink application by a line system.

By using the aforementioned ink composition of the invention in the ink applying step, occurrence of secondary color image deformation may be suppressed more effectively.

Concerning the first ink composition and the second ink composition in the invention, the aforementioned ink composition may be applied without any particular limitation. In addition, it is characterized in that the second ink composition is different from the first ink composition, and contained components may be different, and the contents of each component may be different. In the invention, from the viewpoint of suppression of secondary color image deformation, it is preferable that at least the coloring materials are different from each other or the contents of the coloring materials are different from each other, and it is more preferable that the coloring materials are different from each other.

—Treating Liquid Applying Step—

The treating liquid applying step may be constructed so that the aforementioned treating liquid which form an aggregate when contacted with the ink composition is applied on the recording medium, and the ink composition and the treating liquid are contacted with each other to form an image. In this case, when the treating liquid is contacted with, for example, the ink composition containing a pigment particle, dispersed particles containing the pigment particles in the ink composition are aggregated, and an image is fixed on the recording medium.

Details and preferable embodiments of the treating liquid are as described above.

Application of the treating liquid may be performed by applying known methods such as a coating method, an ink jet method, and an immersion method. The coating method may be performed by a known coating method using a bar coater, an extrusion die coater, an air doctor coater, a bread coater, a rod coater, a knife coater, a squeeze coater, a reverse roll coater, or a bar coater. Details of the ink jet method are as described above.

The treating liquid applying step may be provided before or after the ink applying step using the ink composition. In the invention, an embodiment in which the ink applying step is provided after the treating liquid is applied in a treating liquid applying step, is preferable. That is, an embodiment in which before application of the ink composition on the recording medium, a treating liquid for aggregating a coloring material (preferably pigment) in the ink composition is applied in advance, and the ink composition is applied so as to contact with the treating liquid applied on the recording medium to form an image, is preferable. Thereby, ink jet recording may be speeded-up and, even when high speed recording is performed, an image having the high density, and high resolution is obtained.

The ink-jet recording method of the invention may be a method as follows. That is, in an embodiment, an intermediate transfer body is used for a recoeding medium on which an image is to be formed is used at first, and then, the ink composition of the invention, by an ink-jet method (an ink applying step or an ejection step), and a treating liquid that is capable of formation of an aggregate when the treating liquid is in contact with the ink composition (a treating liquid applying step) is applied onto the intermediate transfer body, and after contacting the ink composition with the treating liquid to form an image on the intermediate transfer body, the image formed on the intermediate transfer body is transferred to a desired final recording medium (a transfer step). Also in this case, an embodiment in which ejecting the ink composition (the ejection step) is conducted after applying the treating liquid (the treating liquid applying step) is preferred.

In the invention, it is preferable that an ink applying step is provided after the treating liquid applying step, and a heating-drying step of drying by heating the treating liquid on the recording medium is further provided after application of the treating liquid on the recording medium, and before application of the ink composition. By drying by heating the treating liquid in advance before the ink applying step, ink coloring property such as blur prevention becomes good, and a visible image which is good in color density and the hue may be recorded.

Drying by heating is performed by a known heating means such as a heater, a ventilating means utilizing ventilation from a dryer, or a means of a combination thereof. Examples of the heating method include a method of giving heat with a heater from a side of the recording medium opposite from a treating liquid applied surface, a method of blowing warm air or hot air against a treating liquid application surface of the recording medium, and a heating method using an infrared heater, and heating may be performed by combining plural of them.

—Recording Medium—

The ink jet recording method of the invention is to record an image on the recording medium.

The recording medium is not particularly limited, and general printing paper containing cellulose as a main component such as so-called high-quality paper, coated paper, and art paper may be used. The general printing paper containing cellulose as a main component absorbs and dries an ink relatively slowly, easily causes coloring material movement after droplet is spotted, and easily deteriorates image quality in image recording by a general ink jet method using an aqueous ink. However, according to the ink jet recording method of the invention, coloring material movement is suppressed, and a high-quality image excellent in the color density and the hue may be recorded.

As the recording medium, a recording medium which is generally commercially available may be used, and examples include high quality paper such as OK PRINCE HIGH QUALITY (trade name, manufactured by Oji Paper Co., Ltd.), SHIORAI (trade name, manufactured by Nippon Paper Industries Co., Ltd.), and NEW NP HIGH QUALITY (trade name, manufactured by Nippon Paper Industries Co., Ltd.), fine coated paper such as OK EVER LITE COAT (trade name, manufactured by Oji Paper Co., Ltd.) and AURORA S (trade name, Nippon Paper Industries Co., Ltd.), light coated paper (A3) such as OK COAT L (trade name, manufactured by Oji Paper Co., Ltd.) and AURORA L (trade name, manufactured by Nippon Paper Industries Co., Ltd.), coated paper (A2, B2) such as OK TOP COAT+(trade name, manufactured by Oji Paper Co., Ltd.) and AURORA COAT (trade name, manufactured by Nippon Paper Industries Co., Ltd.), and an art paper (A1) such as OK KANEFUJI+(trade name, manufactured by Oji Paper Co., Ltd.) and TOKUBISHI ART (trade name, manufactured by Nippon Paper Industries Co., Ltd.). Further, various papers for photography for use in ink jet recording may be used.

Among them, from the viewpoint of that the effect of suppressing coloring material movement is great, and a high quality image having better color density and hue than the previous ones is obtained, a recording medium having a water absorption coefficient Ka of 0.05 $mL/m^2 \cdot ms^{1/2}$ to 0.5 $mL/m^2 \cdot ms^{1/2}$ is preferable, a recording medium having the water absorption coefficient Ka of 0.1 $mL/m^2 \cdot ms^{1/2}$ to 0.4 $mL/m^2 \cdot ms^{1/2}$ is more preferable, and a recording medium having the water absorption coefficient Ka of 0.2 $mL/m^2 \cdot ms^{1/2}$ to 0.3 $mL/m^2 \cdot ms^{1/2}$ is further preferable.

The water absorption coefficient Ka has the same meaning as that described in JAPAN TAPPI Paper Pulp Test Method No. 51:2000 (published by JAPAN TAPPI) and, specifically, the absorption coefficient Ka is calculated by a difference in a water transfer amount between at the contact time of 100 ms and at the contact time of 900 ms using an automatic scanning liquid absorbing meter KMS500Win (trade name, manufactured by Kumagai Riki Kogyo Co., Ltd.).

In the invention, it is preferable that the application amount of the treating liquid and the application amount of the aqueous ink are regulated, if necessary. For example, in order to regulate physical properties such as viscoelasticity of an aggregate formed by mixing the treating liquid and the aqueous ink, the application amount of the treating liquid may be changed in accordance with the recording medium.

Next, one example of formation of an image by the ink jet recording method of the invention will be specifically explained by referring to FIG. 1. FIG. 1 is a schematic construction view showing one example of a whole construction of an ink jet recording apparatus.

The ink-jet recording apparatus shown in FIG. 1 includes a treating liquid applying part 12 having a treating liquid ejection head 12S for ejecting a treating liquid, a treating liquid drying zone 13 having heating means (not illustrated) for drying the applied treating liquid, an ink ejection part 14 for ejecting various kinds of aqueous inks, an ink drying zone 15 for drying the ejected aqueous ink successively toward the direction of transporting a recording medium (direction of an arrow in the drawing). Further, an image fixing part 16 for fixing an image on the recording medium is disposed at a downstream of the ink drying zone 15 in the direction of transporting the recording medium.

The recording medium supplied to the ink-jet recording apparatus is conveyed from a paper supply part for supplying a recording medium from a casing in which the recording medium is loaded, by way of conveyor rolls, through the treating liquid applying part 12, the treating liquid drying zone 13, the ink ejection part 14, and the ink drying zone 15 successively and, if necessary through the image fixing part 16 at which the recording medium is subjected to a fixing treatment, to an accumulation part. For the transportation, a drum conveying system using a drum member, a belt conveyor system, a stage conveyor method using a stage may be employed as well as the method by the conveyor rollers.

Among the conveyor rollers disposed in plurality, at least one roller can be a driver roller which receives power transmitted from a motor (not illustrated). By rotating the driver roller rotated by the motor at a constant speed, a predetermined conveying amount of the recording medium is conveyed in a predetermined direction.

In the treating liquid applying part 12, a treating liquid ejection head 12S connected to a storage tank which stores the treating liquid is provided. The treating liquid ejection head 12S may eject the treating liquid through an ejection nozzle arranged so as to face a recording surface of the recording medium, and may apply liquid droplets of the treating liquid onto the recording medium. The treating liquid applying part 12 is not limited to a system of ejecting from a nozzle-like head, and a coating system using a coating roller may be adopted. This coating system may easily apply the treating liquid to an approximately whole surface including an image region to which ink droplets are spoted at the ink ejection part 14 arranged on a downstream side. In order to make the thickness of the treating liquid on the recording medium constant, for example, a method of using an air knife, or arranging a member having a sharp angle by providing a gap corresponding to a prescribed amount of the treating liquid between the recording medium, may be adopted.

A treating liquid drying zone 13 is arranged at a downstream side of the treating liquid applying part 12 in the direction of conveying the recording medium. The treating liquid drying zone 13 may be constructed using known heating means such as a heater, or a ventilating means utilizing ventilation from a drier, or a means of a combination of them. Examples of the heating method include a method of arranging a heating element such as a heater on the opposite side of a blocking layer forming surface of the recording medium (e.g. when the recording medium is automatically conveyed, downstream of a conveying mechanism of carrying and conveying the recording medium), a method of blowing warm air or hot air against the blocking layer forming surface of the recording medium, and a heating method of using an infrared heater, and heating may be performed by combining plural of them.

Further, since the surface temperature of the recording medium varies depending on the kind of the recording medium (material, thickness, etc.) or enviromental temperature, etc., it is preferred to provide a measuring part for measuring the surface temperature of the recording medium and a control mechanism for feeding back the value of the measured surface temperature of the recording medium to a heating control part, thereby controlling the temperature, and also to form the blocking layer. A contact or non-contact type thermometer is preferred as the measuring part for measuring the surface temperature of the recording medium.

Further, a solvent removing roller or the like may be used for removing the solvent. A system of removing an excess solvent from the recording medium by an air knife may be used in another embodiment.

The ink ejection part 14 is disposed at the downstream side of the treating liquid drying zone 13 in the direction of transporting the recording medium. In the ink ejection part 14, recording heads (ink ejection heads) 30C, 30M, 30Y and 30K connected respectively to ink storing sections for storing inks of respective colors of cyan (C), magenta (M), yellow (Y), and black (K) are disposed. An aqueous ink (liquid composition) containing a pigment corresponding to each hue, polymer particles, a hydrophilic organic solvent, a surfactant, and water is stored in each of the ink storing sections (not illustrated), and supplied to each of ink ejection heads 30C, 30M, 30Y, 30K when recording an image as necessary.

The ink ejection heads 30C, 30M, 30Y, and 30K eject inks corresponding to an image respectively from the ejection nozzles disposed so as to face the recording surface of the recording medium. Inks of respective colors are applied on the recording surface of the recording medium thereby recording a color image.

The treating liquid ejection head 12S, as well as the ink ejection heads 30K, 30C, 30M, and 30Y are each configured as a full line head where a plurality of ejection ports (nozzles) are arranged over a maximum recording width of an image (maximum recording width) to be recorded on the recording medium. Image recording can be performed at a higher speed to the recording medium as compared with the case of a serial type that performs recording while a short shuttle head reciprocally scans in the lateral direction of the recording medium (direction perpendicular to the transporting direction at the recording medium transporting surface). In the invention, either recording by a serial type or recording by a system capable of recording at a relative higher speed, for example, recording by the single pass system which is a system capable of recording by ejection by one scanning in the direction of main scanning may be adopted. According to the image recording method of the invention, an image with high quality having high image reproducibility and excellent scratch resistance can be obtained while maintaining the ejection stability even in the system by the single pass.

In this case, all of the treating liquid ejection head 12S, and ink ejection heads 30C, 30M, 30Y and 30K have the same structure.

It is preferred that the application amount of the treating liquid and the application amount of the aqueous ink are controlled in accordance with requirement. For example, the application amount of applying the treating liquid may be changed for controlling the physical property such as viscoelasticity of an aggregate formed by mixing the treating liquid and the aqueous ink, in accordance with the recording medium.

The ink drying zone 15 is disposed at the downstream side of the ink ejection part 14 in the direction of transporting the recording medium. The ink drying zone 15 can be constituted in a similar manner to that in the treating liquid drying zone 13.

An image fixing part 16 may be disposed separately in accordance with requirement for providing a more intense fixing property to the recording medium after drying the image.

The image fixing part 16 is disposed further to the downstream of the ink drying zone 15 in the direction of transporting the recording medium. In the image fixing part 16, a pair of rollers (fixing rollers 40A and 40B) which are in press contact with each other are disposed and, when the recording medium passes between the fixing rollers 40A and 40B, the image formed on the recording medium can be pressurized and heated to improve the fixing property of the image recorded on the recording medium. As the fixing rollers 40A and 40B, a pair of rollers in which one is a pressurizing roller and the other is a heating roller are preferred but the fixing rollers are not limited to such a pair.

Further, in the ink-jet recording apparatus, in the conveying path from the paper supply part to the accumulation part, heating means for applying a heat treatment to the recording medium may also be disposed. By elevating the temperature of the recording medium to a predetermined temperature by the heating means disposed at, for example, a predetermined position at the upstream side of the treating liquid drying zone, or a predetermined position between the ink ejection part 14 and the ink drying zone 15, it is possible to carry out drying and fixing effectively.

EXAMPLES

The present invention will be specifically explained by way of Examples, but the invention is not limited to the following Examples as far as the gist thereof is not departed. Unless otherwise is indicated, "part" and "%" are on basis of mass.

The weight average molecular weight was measured by gel permeation chromatography (GPC). In GPC, HLC-8020GPC (trade name, manufactured by Tosoh Corporation) was used, and 3 pieces of TSKgel Super Multipore HZ-H (trade name, manufactured by Tosoh Corporation, 4.6 mm ID×15 cm) were used as the column, and THF (tetrahydrofuran) was used as an eluate. Further, the measurement was performed by using an IR detector under the conditions at a sample concentration of 0.35 mass %, a flow rate of 0.35 mL/min, a sample ejection amount of 10 μL, and a measuring temperature of 40° C. A calibration curve was prepared based on eight samples of "standard sample TSK: standard, polystyrene" of "F-40", "F-20", "F-4", "F-1", "A-5000", "A-2500", "A-1000", and "n-propylbenzene" manufactured by Tosoh Corporation.

(Synthesis of Polymer Dispersant P-1)

In accordance with the following scheme, a polymer dispersant P-1 was synthesized as shown below.

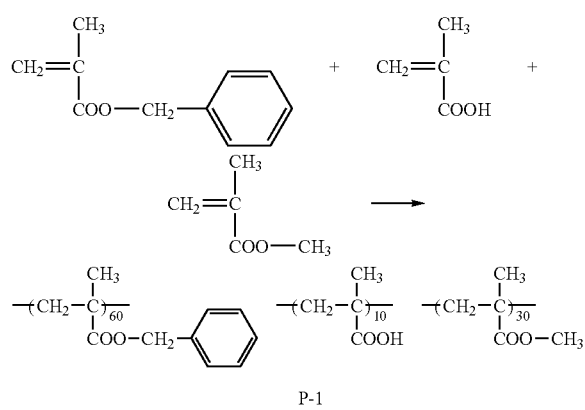

P-1

88 g of methyl ethyl ketone was put in a 1000 mL three-necked flask equipped with a stirrer and a cooling tube and heated to 72° C. in a nitrogen atmosphere, to which a solution in which 0.85 g of dimethyl-2,2'-azobisisobutyrate, 60 g of benzyl methacrylate, 10 g of methacrylic acid, and 30 g of methyl methacrylate were dissolved in 50 g of methyl ethyl ketone was dropped over 3 hr. After completing the dropping and further allowing the mixture to react for 1 hr, a solution in which 0.42 g of dimethyl-2,2'-azobisisobutyrate was dissolved in 2 g of methyl ethyl ketone was added, and the mixture was heated for 4 hr while elevating the temperature to 78° C. The obtained reaction solution was re-precipitated twice in a great excess of hexane and a precipitated resin was dried, thereby obtaining 96 g of a polymer dispersant P-1.

The composition of the obtained resin was confirmed by $^1$H-NMR and the weight average molecular weight (Mw) determined by GPC was 44,600. Further, when an acid value was determined according to the method described in JIS standards (JISK0070:1992, the disclosure of which is incorporated by reference herein), the obtained resin was revealed having an acid value of 65.2 mgKOH/g.

(Preparation of Dispersion C of Resin-Coated Pigment Particle)

Ten parts of Pigment Blue 15:3 (trade name, PHTHALO-CYANINE BLUE A220, manufactured by Dainichiseika Color & Chemicals Mfg. Co., Ltd.), 5 parts of the polymer dispersant P-1, 42 parts of methyl ethyl ketone, 5.5 parts of a 1N aqueous NaOH solution, and 87.2 parts of ion-exchange water were mixed, and the mixture was dispersed for 2 hours to 6 hours with a bead mill using 0.1 mmφ zirconia beads.

Methyl ethyl ketone was removed from the resulting dispersion at 55° C. under reduced pressure and, further, a part of water was removed. Thereafter, this was subjected to centrifugation treatment at 8000 rpm for 30 minutes using a high speed centrifugation cooling machine 7550 (trade name, manufactured by Kubota Corporation) and employing a 50 mL centrifugation tube to recover the supernatant other than the precipitate. Thereafter, the pigment concentration was determined from absorption spectrum, and a dispersion of resin-coated pigment particles (pigment covered with polymer dispersant) having a pigment concentration of 10.2 mass % was obtained.

(Preparation of Dispersion M of Resin-Coated Pigment Particle)

A dispersion M of resin-coated pigment particles (pigment coated with polymer dispersant) was prepared in a similar manner as in that in the preparation of the dispersion C of the resin-coated pigment particles except that Pigment Red 122 was used in place of the Pigment Blue 15:3 (trade name; PHTHALOCYANINE BLUE A220, manufactured by Dainichiseika Color & Chemicals Mfg. Co., Ltd.) in the preparation of the dispersion C of resin-coated pigment particles.

(Synthesis of Self-Dispersing Polymer Particle and Preparation of Aqueous Dispersion)

A 2 liter three-necked flask equipped with a stirrer, a thermometer, a refluxing condenser, and a nitrogen gas introducing tube was charged with 360.0 g of methyl ethyl ketone, and a temperature of the solvent was raised to 75° C. A mixed solution containing 158.4 g of methyl methacrylate, 54.0 g of methoxyethyl acrylate, 126.0 g of benzyl methacrylate, 21.6 g of methacrylic acid, 72 g of methyl ethyl ketone, and 1.44 g of "V-601" (trade name, manufactured by Wako Pure Chemical Industries, Ltd.) was added dropwise at a constant rate so that addition was completed in 2 hours. After completion of the addition, a solution containing 0.72 g of "V-601" and 36.0 g of methyl ethyl ketone was added, and the mixture was stirred at 75° C. for 2 hours. Further, a solution containing 0.72 g of "V-601" and 36.0 g of methyl ethyl ketone was added, the mixture was stirred at 75° C. for 2 hours, a temperature of the mixture was raised to 85° C., and stirring was further continued for 2 hours. The weight average molecular weight (Mw) of the resulting copolymer was 66000 (calculated in terms of polystyrene by gel permeation chromatography (GPC); columns used were TSKgel SuperHZM-H, TSKgel SuperHZ4000 and TSKgel SuperHZ200 (trade name, all manufactured by TOSOH Co.).

Then, 668.3 g of the polymerization solution was weighed and put in a reaction vessel, 388.3 g of isopropanol, and 145.7 mL of a 1 mol/L aqueous NaOH solution were added thereto, and an internal temperature of the reaction vessel was raised to 80° C. Then, 720.1 g of distilled water was added dropwise at the rate of 20 mL/min, and the materials were dispersed in water. Thereafter, an internal temperature of the reaction vessel was maintained at 80° C. for 2 hours, at 85° C. for 2 hours, and at 90° C. for 2 hours under the atmospheric pressure and, thereafter, a pressure in the reaction vessel was reduced, and isopropanol, methyl ethyl ketone, and distilled water in a total amount of 913.7 g of were distilled off to obtain a later described aqueous dispersion (B-01Lx) of a self-dispersing polymer (B-01) having a solid content of 28.0%. The average particle diameter of the obtained aqueous dispersion (B-01Lx) was determined, after diluting the aqueous dispersion with water to a concentration appropriate for measurement, by measuring the volume average particle diameter using a NANOTRACKUPA-EX150 (trade name, manufactured by Nikkiso Co., Ltd.) As a result, the average particle diameter of the obtained aqueous dispersion (B-01Lx) was 15 nm.

Numerical value described in each constituent unit of the following compound example (B-01) indicates the mass ratio.

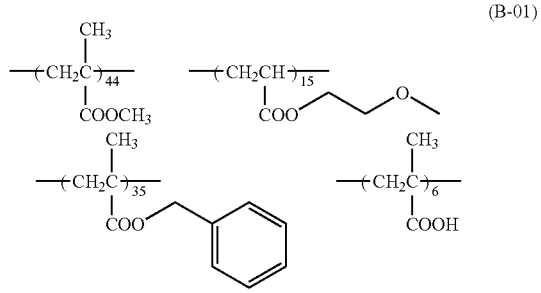

(B-01)

Methyl methacrylate/methoxyethyl acrylate/benzyl methacrylate/methacrylic acid=44/15/35/6 (methacrylic acid derivative ratio: 85 mass %)

According to a similar manner to that of preparation of the B-01 Lx except that a composition of a monomer was changed to the following composition, aqueous dispersions B-02Lx to B-06Lx of the following self-dispersing polymer fine particles were prepared, respectively.

B02Lx:
Methyl methacrylate/phenoxyethyl acrylate/benzyl methacrylate/acrylic acid=50/15/30/5 (methacrylic acid derivative ratio: 80 mass %), Average particle diameter: 45 nm B-03Lx:
Phenoxyethyl acrylate/benzyl methacrylate/isobutyl methacrylate/methacrylic acid=16/35/43/6 (methacrylic acid derivative ratio: 84 mass %), Average particle diameter: 40 nm B-04Lx:
Methyl methacrylate/phenoxyethyl methacrylate/benzyl methacrylate/methacrylic acid=45/23/26/6 (methacrylic acid derivative ratio: 100 mass %), Average particle diameter: 30 nm B-05Lx:
Methyl methacrylate/benzyl acrylate/acrylic acid=70/25/5 (methacrylic acid derivative ratio: 70% mass), Average particle diameter: 40 nm B-06Lx:
Methyl methacrylate/benzyl acrylate/acrylic acid=65/30/5 (methacrylic acid derivative ratio: 65 mass %), Average particle diameter: 35 nm Further, according to a similar manner to that in the preparation of the B-01 Lx except that a composition of a monomer was changed to the following composition, aqueous dispersions B-10Lx to B-102Lx of comparative polymer fine particles were prepared, respectively.

B-101Lx:
Methyl methacrylate/benzyl acrylate/acrylic acid=60/35/5 (methacrylic acid derivative ratio: 60 mass %)

B-102Lx
Methyl methacrylate/benzyl acrylate/acrylic acid=45/50/5 (methacrylic acid derivative ratio: 45 mass %)

Example 1

An ink set 1 for ink jet recording containing cyan ink C-1, magenta ink M-1 and a treating liquid was prepared as follows.

(Preparation of Aqueous Ink)

Using the dispersions C and M of the resin-coated pigment particles obtained above, each component was mixed so as to be the following each composition to prepare cyan and magenta pigment ink solutions, respectively. After preparation, each of the resulting pigment ink solutions was charged into a plastic disposable syringe, and filtered with a PVDF 5 μm filter (trade name; Millex-SV, manufactured by Millipore, diameter of 25 mm) to prepare a cyan ink (C-1) and a magenta ink (M-1). In addition, a viscosity, a surface tension and a pH measured by a similar method to that of physical property values of the following treating liquid are shown in Table 1.

| <Cyan ink C-1> | |
|---|---|
| Cyan pigment (Pigment Blue 15:3) | 4% |
| Polymer dispersant (P-1) | 2% |
| Polymer fine particle (B-01Lx) | 8% |
| SANNIX GP250 | 10% |
| (trade name, hydrophilic organic solvent, manufactured by Sanyo Chemical Industries, Ltd.) | |
| Diethylene glycol monoethyl ether | 5% |
| (hydrophilic organic solvent, manufactured by Wako Pure Chemical Industries, Ltd.) | |
| OLFINE E1010 | 1% |
| (trade name, surfactant, manufactured by Nisshin Chemical Industry Co., Ltd.) | |
| Ion-exchange water | 70% |

| <Magenta ink M-1> | |
|---|---|
| Magenta pigment (Pigment Red 122) | 4% |
| Polymer dispersion (P-1) | 2% |
| Polymer fine particle (water dispersion B-01Lx) | 8% |
| SANNIX GP250 | 10% |
| (trade name, hydrophilic organic solvent, manufactured by Sanyo Chemical Industries, Ltd.) | |
| Diethylene glycol monoethyl ether | 5% |
| (manufactured by Wako Pure Chemical Industries, Ltd., hydrophilic organic solvent) | |
| OLFINE E1010 | 1% |
| (trade name, surfactant, manufactured by Nisshin Chemical Industry Co., Ltd.) | |
| Ion-exchange water | 70% |

(Preparation of Treating Liquid)

Each component was mixed so as to be the following composition to prepare a treating liquid.

| -Composition of treating liquid- | |
|---|---|
| Malonic acid | 15.0% |
| (manufactured by Wako Pure Chemical Industries, Ltd.) | |
| Diethylene glycol monomethyl ether | 20.0% |
| (manufactured by Wako Pure Chemical Industries, Ltd.) | |
| Sodium N-oleoyl-N-methyltaurine (surfactant) | 1.0% |
| Ion-exchanged water | 64.0% |

When physical property values of the treating liquid were measured, a viscosity was 2.6 mPa·s, a surface tension was 37.3 mN/m, and a pH was 1.6. The surface tension was measured using Automatic Surface Tensiometer CBVP-Z (trade name, manufactured by Kyowa Interface Science Co., Ltd.) under the condition of 25° C., and the viscosity was measured using VISCOMETER TV-22 (trade name, manufactured by TOKI SANGYO CO., LTD.) under the condition of 20° C. The pH was measured at 25° C.

Examples 2 to 6, Comparative Examples 1 and 2

According to a similar manner to that in Example 1 except that aqueous dispersions B-02Lx to B-06Lx, B-101Lx, B-102Lx of self-dispersing polymer obtained above were used in place of the aqueous dispersion B-01 Lx of the polymer particles in Example 1, ink sets 2 to 8 for ink jet recording were prepared, respectively.

<Image Recording and Evaluation>
—1. Secondary Color Image Deformation—

First, as a recording medium, TOKUBISHI ART BOTH SIDES N (trade name, manufactured by Mitsubishi Paper Mills Limited, water absorption coefficient Ka=0.21 mL/m$^2$·ms$^{1/2}$) was prepared, the treating liquid obtained above was coated and dried, and an image was recorded using a cyan ink and a magenta ink as follows. Recording was performed by preparing a full line head GELJET GX5000 Printer Head (trade name, manufactured by Ricoh Japan) as a recording head, and charging a storage tank connected to this with the cyan ink or the magenta ink obtained above.

First, Tokubishi Art Both Sides N was fixed on a stage which may be linearly moved at 500 mm/sec in a predetermined direction. And a temperature of the stage was maintained at 30° C. This was coated with the treating liquid obtained above using a wire bar coater to have a thickness of about 2.5 μm (malonic acid 0.38 g/m$^2$) and dried at 50° C. for 2 seconds immediately after coating.

Thereafter, the full line head GELJET GX5000 Printer Head (trade name, manufactured by Ricoh Japan) was fixed and arranged so that a line head direction (main scanning direction) with which nozzles are aligned is tilted by 75.7° relative to a direction orthogonal with a moving direction (sub-scanning direction) of the stage, the magenta ink was ejected in a line system under the ejection condition of the ink droplet amount of 2.4 pL, a ejection frequency of 24 kHz, and a resolution of 1200 dpi×1200 dpi while the recording medium was moved at a constant rate in a direction of the sub-scanning, thereby, a magenta solid image was printed. Subsequently, the cyan ink was ejected so as to overlap with this magenta solid image, thereby, a cyan solid image was printed. Thereupon, the time interval from completion of droplet ejection of the magenta ink to initiation of droplet ejection of the cyan ink was 0.3 seconds. A combination of the cyan ink and the magenta ink is shown in the following Table 1.

Immediately after printing, the printed material was dried at 60° C. for 3 seconds, passed between one pair of fixing rollers heated at 60° C., and subjected to fixing treatment at the nip pressure of 0.25 MPa and the nip width of 4 mm to obtain a sample for evaluation.

The evaluation sample was observed with a 50× magnification microscope and with the naked eyes, and the presence or the absence of secondary color image deformation was evaluated according to the following criteria. The evaluation results are shown in Table 1.

—Evaluation Criteria—
A: Secondary color image deformation is not recognized.
B: Secondary color image deformation is slightly observed with a microscope, but not with the naked eyes.
C: Secondary color image deformation is observed with a microscope and the naked eyes.
D: Image deformation is generated to such an extent that a background of paper is seen with a microscope.

—2. Scratch Resistance—

TOKUBISHI ART BOTH SIDES N (trade name, recording medium, manufactured by Mitsubishi Paper Mills Limited) was fixed on a stage which moves at 500 mm/sec, a treating liquid was coated with a wire bar coater at a thickness of about 2.5 μm, and dried at 50° C. for 2 seconds. Thereafter, a cyan solid image was printed with a printer head GELJET GX5000 (trade name, manufactured by Ricoh Japan) which was arranged and fixed tilted relative to a scanning direction, at resolution of 1200 dpi×600 dpi, a droplet ejection amount of 3.5 pL in a line system.

Immediately after printing, the material was dried at 60° C. for 3 seconds, passed between one pair of fixing rollers heated at 60° C., and subjected to fixation at the nip pressure of 0.25 MPa and the nip width of 4 mm to prepare a printing sample.

Unprinted TOKUBISHI ART BOTH SIDES N (trade name, manufactured by Mitsubishi Paper Mills Limited) was wound around a paperweight (weight of 470 g, and size 15 mm×30 mm×120 mm) (an area in which unprinted TOKUBISHI ART and a printing sample are contacted with each other was 150 mm$^2$), and the printing sample was rubbed three reciprocations (corresponding to a load of 260 kg/m$^2$). A printing surface after rubbing was observed with the naked eyes, and evaluated according to the following evaluation criteria.

—Evaluation Criteria—
A: Peeling of an image (coloring material) is not recognized on a printing surface.
D: Peeling of an image (coloring material) is recognized.

As a result of evaluation, the inks of the invention are not deteriorated in scratching resistance, and all have A in the evaluation.

—3. Initial Ejection Property—

Using a printer head GELJET GX5000 Printer Head (trade name, manufactured by Ricoh Japan), 96 lines with a length of 10 cm at the ink droplet amount of 3.5 μL, the ejection frequency of 24 kHz, and nozzle arranging direction×conveying direction of 75 dpi×1200 dpi. As a recording medium, a color photograph finishing Pro (trade name, manufactured by Fuji Film) was used. A distance between 96 lines at a site which is 5 cm from a droplet ejection initiation part of a printing sample was measured with a dot analyzer DA-6000 (trade name, manufactured by Oji Scientific Instruments), a standard deviation was calculated, and the initial ejection property (direction precision) was evaluated according to the following evaluation criteria.

—Evaluation Criteria—
A: 3 μm or more and less than 4 μm
B: 4 μm or more and less than 5 μm
D: 5 μm ore more

TABLE 1

| No. | Cyan ink | Magenta ink | Polymer fine particle aqueous dispersion | Methacrylic acid derivative ratio (%) | Cyan ink Viscosity (mPa·s) | Cyan ink Surface tension (mN/m) | Magenta ink Viscosity (mPa·s) | Magenta ink Surface tension (mN/m) | Secondary color image deformation | Initial ejection property | Remark |
|---|---|---|---|---|---|---|---|---|---|---|---|
| 1 | C-1 | M-1 | B-01Lx | 85 | 4.2 | 35.4 | 4.5 | 35.4 | A | A | Invention |
| 2 | C-2 | M-2 | B-02Lx | 80 | 4.5 | 35.2 | 4.7 | 35.2 | A | A | Invention |
| 3 | C-3 | M-3 | B-03Lx | 84 | 4.1 | 35.4 | 4.2 | 35.4 | A | A | Invention |
| 4 | C-4 | M-4 | B-04Lx | 100 | 4.7 | 35.6 | 4.8 | 35.6 | A | A | Invention |
| 5 | C-5 | M-5 | B-05Lx | 70 | 4.8 | 35.2 | 4.9 | 35.2 | B | A | Invention |
| 6 | C-6 | M-6 | B-06Lx | 65 | 4.9 | 35.1 | 4.8 | 35.4 | B | A | Invention |
| 7 | C-7 | M-7 | B-101Lx | 60 | 4.6 | 35.4 | 4.8 | 35.4 | C | A | Comparative Example |
| 8 | C-8 | M-8 | B-102Lx | 45 | 4.7 | 35.4 | 5.0 | 35.4 | D | B | Comparative Example |

As shown in Table 1, in No. 1 to No. 6 (invention), when a secondary color image is formed, image deformation due to coloring material movement is suppressed, and a multi-color image which is good in the color density and the hue and excellent in scratching resistance is obtained. On the other hand, in No. 7 and No. 8 (Comparative Example), secondary color image deformation occur.

The invention includes the following exemplary embodiments.

<1> An ink set for ink jet recording, including an ink composition containing a polymer particle having 65 mass % or more of a constituent unit derived from a methacrylic acid derivative and a coloring material; and a treating liquid which form an aggregate when contacted with the ink composition.

<2> The ink set for ink jet recording of <1>, wherein the polymer particle includes 80 mass % or more of the constituent unit derived from a methacrylic acid derivative.

<3> The ink set for ink jet recording of <1>, wherein the polymer particle is a self-dispersing polymer particle.

<4> The ink set for ink jet recording of <3>, wherein the self-dispersing polymer particle includes a water-insoluble polymer comprising a hydrophilic constituent unit derived from a hydrophilic group-containing monomer, and a constituent unit derived from an aromatic group-containing monomer.

<5> The ink set for ink jet recording of <4>, wherein the hydrophilic group-containing monomer is a dissociable group-containing monomer having a dissociable group and an ethylenic unsaturated bond.

<6> The ink set for ink jet recording of <5>, wherein the dissociable group-containing monomer is an unsaturated carboxylic acid monomer.

<7> The ink set for ink jet recording of <4>, wherein the self-dispersing polymer particle includes a constituent unit derived from an aromatic group-containing (meth)acyrylate monomer.

<8> The ink set for ink jet recording of <7>, wherein the content of the aromatic group-containing (meth)acrylate monomer is 10 mass % to 95 mass %.

<9> The ink set for ink jet recording of <4>, wherein the molecular weight range of the water-insoluble polymer constituting the self-dispersing polymer particle is 3000 to 200000 as expressed by the weight average molecular weight.

<10> The ink set for ink jet recording of <1>, wherein the average particle diameter of the polymer particle is 1 to 400 nm as expressed by the volume average particle diameter.

<11> The ink set for ink jet recording of <1>, wherein the content of the polymer particle in the ink composition is 1 to 30 mass %.

<12> The ink set for ink jet recording of <1>, wherein a pH of the treating liquid at 25° C. is 0.5 to 6.

<13> The ink set for ink jet recording of <1>, wherein the treating liquid comprises a compound having a phosphoric acid or a carboxylic acid.

<14> The ink set for ink jet recording of <1>, wherein the coloring material is a pigment.

<15> The ink set for ink jet recording of <14>, wherein the coloring material is a pigment covered with a polymer dispersant.

<16> An ink jet recording method comprising applying an ink composition containing a coloring material, and a polymer particle having 65 mass % or more of a constituent unit derived from methacrylic acid derivative, on a recording medium, by an ink jet system, and applying a treating liquid which form an aggregate when contacted with the ink composition, on a recording medium.

<17> The ink jet recording method of <16>, wherein the ink application comprises applying a first ink composition on a recording medium, and applying a second ink composition different from the first ink composition on the recording medium within 1 second from application of the first ink composition, and at least one of the first application and the second application is ink application by a line system.

<18> The ink jet recording method of <16>, wherein the recording medium has an absorption coefficient Ka of water of 0.05 to 0.5 mL/m$^2$·ms$^{1/2}$.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink set for ink jet recording comprising:
    an ink composition containing a self-dispersing polymer particle having 84 mass % or more of a constituent unit derived from a methacrylic acid derivative and a coloring material; and
    a treating liquid which forms an aggregate when contacted with the ink composition, wherein
    a pH of the treating liquid at 25° C. is from 0.5 to 1.6;
    the self-dispersing polymer particle comprises a water-insoluble polymer containing a hydrophilic constituent unit derived from a hydrophilic group-containing monomer and a constituent unit derived from an aromatic group-containing monomer;

the self-dispersing polymer particle comprises a constituent unit derived from an aromatic group-containing (meth)acrylate monomer;

a content of the constituent unit derived from the aromatic group-containing (meth)acrylate monomer in the self-dispersing polymer particle is from 10 mass % to 95 mass %;

a content of the self-dispersing polymer particles is from 1 mass % to 30 mass % with respect to the ink composition; and a content of the coloring material is from 1 mass % to 25 mass % with respect to the ink composition.

2. The ink set for ink jet recording of claim 1, wherein a weight-average molecular weight of the water-insoluble polymer constituting the self-dispersing polymer particle is from 3,000 to 200,000.

3. The ink set for ink jet recording of claim 1, wherein a volume-average particle diameter of the polymer particle is from 1 nm to 400 nm.

4. The ink set for ink jet recording of claim 1, wherein the treating liquid comprises a compound having a phosphoric acid or a carboxylic acid.

5. The ink set for ink jet recording of claim 1, wherein the self-dispersing polymer particle comprises a water-insoluble polymer containing a hydrophilic constituent unit derived from a hydrophilic group-containing monomer and a constituent unit derived from an aromatic group-containing monomer, and the hydrophilic constituent unit derived from a hydrophilic group-containing monomer is at least one selected from the group consisting of acrylic acid, methacrylic acid, crotonic acid, itaconic acid, maleic acid, fumaric acid, citraconic acid, 2-(methacryloyloxy)methyl succinicate styrenesulfonic acid, 2-acrylamido-2-methylpropanesulfonic acid, 3-sulfopropyl (meth)acrylate, bis(3-sulfopropyl) itaconate, vinylphosphonic acid, vinylphosphate, bis(methacryloyloxyethyl) phosphate, diphenyl-2-acryloyloxyethyl phosphate, diphenyl-2-methacryloyloxyethyl phosphate and dibutyl-2-acryloyloxyethyl phosphate.

6. The ink set for ink jet recording of claim 1, wherein the self-dispersing polymer particle comprises a water-insoluble polymer containing a hydrophilic constituent unit derived from a hydrophilic group-containing monomer and a constituent unit derived from an aromatic group-containing monomer, and the constituent unit derived from an aromatic group-containing monomer is at least one selected from the group consisting of phenoxyethyl (meth)acrylate, benzyl (meth)acrylate, phenyl (meth)acrylate and styrene type monomer.

7. The ink set for ink jet recording of claim 1, wherein the self-dispersing polymer particle comprises a water-insoluble polymer containing a hydrophilic constituent unit derived from a hydrophilic group-containing monomer and a constituent unit derived from an aromatic group-containing monomer, and the water-insoluble polymer is selected from the group consisting of B-01: methyl methacrylate/methoxyethyl acrylate/benzyl methacrylate/methacrylic acid, B-02: methyl methacrylate/phenoxyethyl acrylate/benzyl methacrylate/acrylic acid, B-03: phenoxyethyl acrylate/benzyl methacrylate/isobutyl methacrylate/methacrylic acid, B-04: methyl methacrylate/phenoxyethyl methacrylate/benzyl methacrylate/methacrylic acid, B-05: methyl methacrylate/ benzyl acrylate/acrylic acid, B-06: methyl methacrylate/benzyl acrylate/acrylic acid, and B-07: methyl methacrylate/benzyl acrylate/methacrylic acid.

8. The ink set for ink jet recording of claim 1, wherein the methacrylic acid derivative is a methacrylic acid amide.

9. The ink set for ink jet recording of claim 1, wherein a content of the coloring material is from 5 mass % to 15 mass % with respect to the ink composition.

10. The ink set for ink jet recording of claim 1, wherein the hydrophilic group-containing monomer is a dissociative group-containing monomer having a dissociative group and an ethylenic unsaturated bond.

11. The ink set for ink jet recording of claim 10, wherein the dissociative group-containing monomer is an unsaturated carboxylic acid monomer.

12. The ink set for ink jet recording of claim 1, wherein the coloring material is a pigment.

13. The ink set for ink jet recording of claim 12, wherein the coloring material is a pigment covered with a polymer dispersant.

14. An ink jet recording method comprising:
applying an ink composition containing a coloring material and a self-dispersing polymer particle having 84 mass % or more of a constituent unit derived from a methacrylic acid derivative, on a recording medium, by an ink jet system; and applying a treating liquid which forms an aggregate when contacted with the ink composition, on the recording medium, wherein a pH of the treating liquid at 25° C. is from 0.5 to 1.6;

the self-dispersing polymer particle comprises a water-insoluble polymer containing a hydrophilic constituent unit derived from a hydrophilic group-containing monomer and a constituent unit derived from an aromatic group-containing monomer;

the self-dispersing polymer particle comprises a constituent unit derived from an aromatic group-containing (meth)acyrylate monomer;

a content of the constituent unit derived from the aromatic group-containing (meth)acrylate monomer in the self-dispersing polymer particle is from 10 mass % to 95 mass %;

a content of the self-dispersing polymer particles is from 1 mass % to 30 mass % with respect to the ink composition; and a content of the coloring material is from 1 mass % to 25 mass % with respect to the ink composition.

15. The ink jet recording method of claim 14, wherein the ink application comprises:
applying a first ink composition on the recording medium; and applying a second ink composition different from the first ink composition on the recording medium within 1 second from the application of the first ink composition, wherein at least one of the first ink application or the second ink application is ink application by a line system.

16. The ink jet recording method of claim 14, wherein the recording medium has a water absorption coefficient Ka of from 0.05 mL/m$^2$·ms$^{1/2}$ to 0.5 mL/m$^2$·ms$^{1/2}$.

17. The ink jet recording method of claim 14, wherein the methacrylic acid derivative is a methacrylic acid amide.

* * * * *